United States Patent [19]
Martin et al.

[11] Patent Number: 6,136,144
[45] Date of Patent: Oct. 24, 2000

[54] METHOD OF REMOVING SULFUR FROM A PROCESS GAS STREAM USING A PACKED BED CALCINATOR

[75] Inventors: Richard J. Martin, San Jose, Calif.; John T. Schofield, Villanova, Pa.

[73] Assignee: Thermatrix, Inc., San Jose, Calif.

[21] Appl. No.: 09/123,915

[22] Filed: Jul. 29, 1998

Related U.S. Application Data

[60] Division of application No. 09/086,422, May 29, 1998, abandoned, which is a continuation-in-part of application No. 08/869,688, Jun. 5, 1997, abandoned.
[60] Provisional application No. 60/019,212, Jun. 6, 1996.

[51] Int. Cl.[7] .............................. D21C 11/06; D21C 11/04
[52] U.S. Cl. ...................... 162/14; 162/30.11; 264/37.29; 422/169; 423/175; 423/242.1; 423/245.3
[58] Field of Search .................................. 162/14, 15, 51, 162/30.11; 423/175, 177, 637, 240 R, 245.3, 242.1; 422/168, 169, 170, 185; 264/37.29, 80

[56] References Cited

U.S. PATENT DOCUMENTS

| | | | |
|---|---|---|---|
| 4,385,993 | 5/1983 | Hedrick et al. | 210/675 |
| 4,431,617 | 2/1984 | Farin | 423/232 |
| 4,688,495 | 8/1987 | Galloway | 110/250 |
| 4,823,711 | 4/1989 | Kroneberger et al. | 110/236 |
| 5,147,201 | 9/1992 | Xiong | 431/326 |
| 5,165,884 | 11/1992 | Martin et al. | 431/7 |
| 5,277,759 | 1/1994 | Sannholm | 162/16 |
| 5,320,518 | 6/1994 | Stilger et al. | 431/7 |
| 5,439,509 | 8/1995 | Spink et al. | 95/166 |
| 5,533,890 | 7/1996 | Holst et al. | 431/5 |
| 5,601,790 | 2/1997 | Stilger et al. | 422/168 |
| 5,635,139 | 6/1997 | Holst | 422/108 |
| 5,637,283 | 6/1997 | Stilger | 423/245.1 |
| 5,650,128 | 7/1997 | Holst et al. | 423/240 R |

OTHER PUBLICATIONS

Smook, G. A., *Handbook for Pulp & Paper Technologists*, 1987, 142–145.
Environmental Protection Agency, 40 C.F.R., *Chapter 1*, Subpart BB—Standard for Performance for Kraft Pulp Mills, §429.173–§430.211, Jul. 1, 1996 Edition, 102–167.
de Souza, T.L.C., "Controlling $SO_2$ Emissions from Combustion Sources", 1994 *International Environmental Conference, TAPPI Proceedings*, 1994, 583–589.

(List continued on next page.)

*Primary Examiner*—Dean T. Nguyen
*Attorney, Agent, or Firm*—Woodcock Washburn Kurtz Mackiewicz & Norris LLP

[57] ABSTRACT

The present invention reduces the sulfur and odor emissions from a paper-making Kraft process by recovering the sulfur in the non-combustible gases (NGCs) emitted by the Kraft process. In a first embodiment of the invention, the NGCs are flamelessly oxidized in a flameless thermal oxidizer to form a sulfur oxide-containing, gaseous products stream. The gaseous products stream is scrubbed with a scrubber solution stream to remove the sulfur components resulting in a scrubbed gas stream and spent scrubber solution stream having $S_2O_3$ and $SO_4$, and $SO_3$ soluble salts. At least a portion of the spent scrubber solution from the scrubber is directed back into the Kraft process, thus recovering the sulfur. In a second general embodiment of the invention, the NGCs are flamelessly oxidized in a moving, packed bed calcinator. The calcinator receives a lime mud stream from the Kraft process, forms a packed bed therefrom, calcines the packed bed, and releases it as a quick lime stream. Concurrently, the NCGs are directed through the moving, packed bed and are flamelessly oxidized in a reaction wave in the packed bed to form a gaseous products stream with sulfur components. The sulfur components react with the packed bed to form sulfur/calcium components. The sulfur/calcium components exit the calcinator with the quick lime stream and are recovered by the Kraft process.

15 Claims, 15 Drawing Sheets

OTHER PUBLICATIONS

Padfield, D.H., "Control of Odor From Recovery Units by Direct–Contact Evaporative Scrubbers with Oxidized Black Liquor", *Tappi*, Jan. 1973, 56(1), 83–86.

Harding, C.I. et al., "Using Weak Black Liquor for Sulfur Dioxide Removal and Recovery", *Tappi,* Oct. 1968, 51(10), 48A–51A.

Kiiskilä, E., "Lime Kiln Emission Contol", *Tappi Proceedings of 1990,* Annual Meeting, Atlanta, GA, 1990, 121–126.

Allen, M. et al., "Flameless Thermal Oxidation for Odor Control", presented at the "Inceration Technology" conference, IBC Technical Services Ltd., Environmental Division, Manchester, England, Oct. 24–26, 1995, 11 pages.

Rushton, J.D. et al., "Collection and Treatment of Odorous Kraft Mill Gasses",*Paper Trade J.,* 1972, 36–37.

METHOD OF REMOVING SULFUR FROM A PROCESS GAS STREAM USING A PACKED BED CALCINATOR

CROSS-REFERENCES TO RELATED APPLICATIONS

This application is a divisional of U.S. patent application Ser. No. 09/086,422 filed on May 29, 1998 now abandoned, which in turn is a continuation-in-part of U.S. patent application Ser. No. 08/869,688 filed on Jun. 5, 1997 now abandoned. The '688 application claims the benefit of U.S. Provisional Application Ser. No. 60/019,212, filed Jun. 6, 1996.

FIELD OF THE INVENTION

The present invention relates to the use of a thermal oxidizer to efficiently recover sulfur and reduce odor emitted during the Kraft paper pulping process. More particularly, the present invention recovers the sulfur-containing components in the non-condensible gas streams released during the Kraft process.

BACKGROUND OF THE INVENTION

The Kraft process has been in existence since 1879 and is the dominant wood pulping process today. This is due largely to the comparative simplicity and rapidity of the process, its insensitivity to variations in the wood condition, and its applicability to all wood species, as well as the valuable properties of the wood pulp produced.

In the Kraft process, described in more detail below, wood chips are cooked in white liquor and washed to make pulp. The white liquor is comprised of NaOH and $Na_2S$. The residue of the washing, black liquor, contains alkali lignin, hydrolysis salts, and sulphonation products. Through a number of other processes, including a chemical recovery furnace, the black liquor is regenerated into the white liquor that cooks the wood chips. The economics of the Kraft process depends on the efficiency of the recovery of the black liquor and the regeneration of the white liquor.

Now referring to Prior Art FIG. 1, there is shown a schematic of the Kraft process 10 to further explain its details. In the Kraft process 10, wood chips 40 are placed into a digester and blow tank 12 and cooked with white liquor stream 42 to start the pulping process. White liquor stream 42 is made up of NaOH and $Na_2S$ in aqueous solution. The cooking of the wood chips 40 with the white liquor stream 42 results in a black liquor and pulp stream 44 that is transferred to a washer 14 and washed with wash water 46. This is the start of the black liquor processing section 13 of the Kraft process.

The washer 14 separates the black liquor and pulp stream 44 into a pulp stream 48, which is used to make paper, and a weak black liquor stream 50 comprising about 12 to 15% by weight solids. The weak black liquor stream 50 stream is transferred to oxidizer 16 and oxidized. The oxidized weak black liquor stream 51 is then transferred to the multiple effect evaporator 18 and concentrated to approximately 45 to 50 weight percent solids to become a black liquor stream 52. The black liquor stream 52 is then transferred to forced circulation concentrators 20 where it is concentrated to about 65 weight percent solids. The resulting concentrated black liquor stream 54 is then mixed with make-up $Na_2SO_4$ 56 and directed to a recovery furnace 22, the last element of the black liquor processing section 13.

The recovery furnace 22 of the Kraft process 10 produces a smelt stream 60 that is mixed with a weak white liquor stream 80 in a dissolving tank 24 to produce a green liquor stream 62. The green liquor stream 62, which is comprised of $Na_2S$ and $Na_2CO_3$, is transferred to a green liquor clarifier 26, where dregs 64 are removed. A clarified green liquor stream 63 is then directed to a slaker and causticizer 28, where it is mixed with a quick lime stream 78. The resulting mixture, an unclarified white liquor stream 41, is transferred and clarified in a white liquor clarifier 30. The sediment in the unclarified white liquor stream 41 is removed from the white liquor clarifier 30 as a lime mud stream 68. The clarification also produces the white liquor stream 42, that is directed to the digester and blow tank 12, thus completing the circuitous liquor route of the Kraft process. The white liquor clarifier 30 and the white liquor stream 42 comprise the white liquor processing section 15 of the Kraft process.

The lime mud stream 68 is further processed to produce the weak white liquor stream 80 and a quick lime stream 78. The lime mud stream 68 is directed from the white liquor clarifier 30 to a mud washer and filter 32. In the mud washer and filter 32, the mud is washed with a water stream 70 to produce a washed lime mud stream 66 and the weak white liquor stream 80. As described previously, the weak white liquor stream 80 is directed to the dissolving tank 24.

The washed lime mud stream 66 is further processed in a lime kiln 34. In the kiln 34, the washed lime mud stream 66 is replenished with a make-up $CaCO_3$ stream 72 and the mixture is calcined to produce the quick lime stream 78 and a kiln emissions stream 76. The quick lime stream 78 is directed to the slaker and causticizer 28. The calcining process contributes CO to the kiln emissions stream 76.

The lime kiln 34 also receives a non-condensible gas ("NCG") stream 58 from an NCG collection system 36. The NCG collection system 36 receives NCGs from plant wide sources 74. Plant wide sources 74 comprise all of the locations that generate NCGs, including the head spaces in tanks and other pieces of equipment, the fumes released by the digester and blow tank 12, and any other fumes collected by the NCGs collection system 36. The NCGs are comprised of $SO_2$, $C_{10}H_{16}$ (α-pinene and β-pinene), $H_2S$, $CH_3SH$, $(CH_3)_2S$ and $(CH_3)_2S_2$. In the lime kiln 34, the $SO_2$ in the NCGs reacts with Ca and $O_2$ to form $CaSO_4$, or the $SO_2$ reacts with $Na_2CO_3$ to form $Na_2SO_4$.

The lime kiln 34 burns at least a portion of the partially volatile organic compounds (VOCs) in the NCG stream 58 and another portion may react with the lime in the kiln. Any of the unreacted or uncombusted NCGs are released with the kiln emissions stream 76. If the lime kiln is down, the NCG stream 58 will necessarily be released unprocessed. A scrubbing system (not shown) may be used to scrub the $CO_2$ from the kiln emissions stream 76. Kraft processes typically use rotary lime kilns, though some use a fluidized bed. See G. A. Smook, *Handbook for Pulp & Paper Technologists*, p. 142–145 (1987), which is incorporated by reference herein in its entirety.

Increasingly stringent environmental regulations restrict chemical emissions from pulp mills. The regulated chemical emissions include sulfur dioxide ($SO_2$), α-pinene ($C_{10}H_{16}$), β-pinene ($C_{10}H_{16}$), hydrogen sulfide ($H_2S$), methyl mercaptan ($CH_3SH$), dimethyl sulfide ($(CH_3)_2S$) and dimethyl disulfide ($(CH_3)_2S_2$). Chemical analyses of the pulp mill emissions show that the regulated chemicals are present in concentrations ranging from about 500 ppmv to 15,500 ppmv in the NCG stream 58.

To achieve satisfactory emissions, based on 40 C.F.R Chapter 1, Subpart BB—Standards for Performance for Kraft Pulp Mills, a Kraft process's emissions must meet the following criteria:

$SO_2 \leq 15$ ppmv $H_2S \leq 5$ ppmv $CO \leq 30$ ppmv

Attainment of these criteria generally require total hydrocarbon and total reduced sulfur (TRS) compound destruction and removal efficiencies of $\geq 99.99\%$ and $SO_2$ removal efficiencies of $\geq 98\%$. Approaching and exceeding these destruction and removal efficiencies enhances odor control since the concentration of odorous compounds is reduced closer to their odor thresholds.

A number of methods have been used to achieve satisfactory emissions, as explained in T. L. C. De Souza, *Controlling $SO_2$ Emissions from Combustion Sources,* 1994 *International Environmental Conference, TAPPI Proceedings,* p. 583–589. One method is to optimize the operating conditions in the chemical recovery furnace 22. It has been found that $SO_2$ emissions can be reduced by providing increased $O_2$, efficient air mixing turbulence, and correct bed temperature in the chemical recovery furnace. Mr. de Souza reports that there are several low odor Kraft recovery furnaces that are optimized to achieve $SO_2$ emissions as low as 20–25 ppm.

Another method for reducing emissions is to oxidize the weak black liquor stream 50 prior to it being reduced into strong black liquor stream 54 by direct contact evaporators. See, Don. H. Padfield, *Control of Odor from Recovery Units by Direct-Contact Evaporative Scrubbers with Oxidized Black Liquor,* TAPPI, Vol. 56, No. 1, p. 83, 86 (January 1973)(reporting that an evaporative scrubber was used to reduce $SO_2$ emissions 50–80%).

Another method of reducing emissions is by scrubbing the NCG stream 58 with an alkaline solution. The removal efficiency for a venturi/cross-flow scrubber system was reported at 90% for $H_2S$, $SO_2$ and $CH_3SH$, with 70–80% removal for $(CH_3)_2S$ and $(CH_3)_2S_2$. The scrubbing results in $S_2O_3$ and $SO_4$ salts in the liquid stream leaving the scrubber, which is returned to the Kraft process to be reduced to $Na_2S$. De Souza at 584.

Another method to reduce emissions is to wash $Na_2S$ from the lime mud stream 68 prior to calcination in the kiln 34. The $Na_2S$ in the lime mud stream 68 can become $H_2S$ when exposed to CO, and the $H_2S$ can be oxidized to $SO_2$. By reducing the $Na_2S$ in the lime mud stream, the amount of $SO_2$ in the kiln emissions stream 76 of the kiln is reduced.

Another method to reduce emissions is to dry scrub the emissions from power boilers (not shown) or to scrub the power boiler emissions with an oxidized weak black liquor or NaOH. See, C. I. Harding and S. F. Galeano, *Using Weak Black Liquor for Sulfur Dioxide Removal and Recovery,* TAPPI, Vol.51, No. 10, p. 48A (October 1968).

The lime kiln 34 also reduces the emission of sulfur from the Kraft process. In treating the NCG stream 58, the lime mud/quick lime in the lime kiln absorbs and reacts with a portion of the $SO_2$ present in the NCGs to form $CaSO_4$ and $Na_2SO_4$. However, the absorption reaction does not reduce the $SO_2$ in the gaseous product stream 76 of the lime kiln 34 sufficiently. To further reduce $SO_2$ in the stream 76, a scrubber is installed (not shown). The scrubber may use an NaOH solution. Due to the sulfur load on a lime kiln 34, the stream 76 may need to be treated by both an electrostatic precipitator and a scrubber. Erkki Kiiskila, *Lime Kiln Emission Control,* TAPPI Proceedings of 1990 Annual Meeting, Atlanta Ga., p. 121.

Much attention has also been given to methods of reducing odor emissions from the Kraft process. Marshall Allen, Robert Wilbourn, and David Wright, *Flameless Thermal Oxidation for Odor Control,* presented at the "Incineration Technology" conference, IBC Technical Services Ltd., Environmental Division, Manchester, England (Oct. 24–26, 1995). An easy method is to use pleasant odorants to mask the offensive odor. Another method is to alter the chemical process, as described previously, and reduce the emissions of the offensive chemicals. Atlernatively, the offensive emissions can be adsorbed with activated carbon and zeolites, or scrubbed. Scrubbing is effective for removing the $SO_2$ in the emissions, but theVOCs that create an offensive odor, such as $C_{10}H_{16}$, $CH_3SH$, $(CH_3)_2S$, and $(CH_3)_2S_2$, if removed, are merely in another form that requires further treatment.

Tighter regulatory controls of VOCs emissions have resulted in an emphasis on destructive methods to convert VOCs to benign or easily treatable compounds. Baseline technologies in this group include wet chemical oxidation and bio-treatment. While the baseline technologies have found limited application in odor reduction, the reaction kinetics are generally slow, thus restricting their broad use in process odor control. Conventional treatment technologies, e.g., flares and incinerators, also fall within this group of baseline technologies. Flares and incinerators are widely used to treat VOCs emissions. However, their continued use is uncertain due to a lack of public acceptance and general inability to meet tightening emission control regulations.

New technologies have been developed to treat odor control. Catalytic oxidation has been used effectively to control odor. However, many of the chemical constituents that are problematic from an odor standpoint, e.g. sulfur, tend to poison catalysts. Regenerative thermal oxidation is capable of processing streams containing VOCs but destruction and removal efficiencies below 95% are common. Since odor thresholds are generally a function of concentration, the greater the destruction and removal efficiency, the greater the odor reduction. To achieve this sufficient odor control, it has been determined that the destruction and removal efficiencies need to be greater than 99.99%.

Variable emissions add to the complexity of treating the NCG stream 58. The Kraft process and the additional systems associated with the Kraft process can generate low volume, high concentration emissions and high volume, low concentration emissions. The overall composition of the emissions at any one time varies widely, demanding a robust system to perform the necessary reductions.

Thus, there is a need for a system and method for reducing the emissions and odors of the emissions of a Kraft process to meet environmental regulations. Further, there is a need to recover the sulfur from Kraft process emissions back into the Kraft process. Additionally, there is a need to handle the variable emissions of a Kraft process.

SUMMARY OF THE INVENTION

The present invention is directed to systems and methods for sulfur recovery and odor control in Kraft process paper mills. The present invention accomplishes such recovery and control by using a flameless thermal oxidizer to process non-condensible gases (NCGs) emitted from the Kraft process and converting the sulfur emissions of the flameless thermal oxidizer to soluble salts that are fed back to the Kraft process. This reduces the emissions of regulatory controlled chemicals and odors emitted by the Kraft process.

More particularly, the present invention provides a system and method to dispose of NCGs emitted from a Kraft process. A fume line collects NCGs generated from various parts of the Kraft process. These NCGS are fed into a flameless thermal oxidizer. The flameless thermal oxidizer has a matrix bed of heat-resistant material in its interior. The NCGs flow through this matrix bed, a portion of which is kept above about 1400° F., preferably above about 1600° F. The flameless thermal oxidizer oxidizes sulfur components in the NCGs to $SO_2$ and $SO_3$ components. The flameless thermal oxidizer also oxidizes the VOCs in the non-condensible gases. The hot gases generated by the flameless thermal oxidizer, (reaction gaseous products) flow into a quench where they are cooled. After the quench, the gases flow through a scrubber. The scrubber converts the $SO_2$ and $SO_3$ components into soluble salts. This is accomplished by mixing the gases with a scrubber solution stream containing fresh scrubber solution that absorbs the $SO_2$ and $SO_3$ components and reacts them to form a scrubbed gas and spent scrubber solution stream containing soluble salts. At least a portion of the spent scrubber solution stream is then delivered back to the Kraft process, thus recovering the sulfur released by the Kraft process initially. In an aspect of the invention, white liquor generated by the Kraft process and/or sodium hydroxide is used as the fresh scrubber solution which is used to form the scrubber solution stream entering the scrubber.

In a preferred embodiment of the invention, the scrubber has a scrubber solution stream that comprises a fresh scrubber solution and a recycle portion of the spent scrubber solution stream. The pH of the spent scrubber solution is preferably adjusted to an aqueous pH equal to or greater than 5.0 and preferably from about 5.5 to about 9.0. By maintaining the pH of the spent scrubber solution preferably at a level of from about 5.5 to about 9.0, the absorption of $SO_2$ is enhanced, while inhibiting the absorption of $CO_2$ resulting in less $H_2S$ being generated.

Another aspect of the invention provides a moving, packed bed calcinator system and method thereof for recovering sulfur from a process gas stream. The calcinator receives lime mud through a lime mud inlet, forms it into a packed bed, and directs the packed bed in a packed bed flow direction toward, and out of, a quick lime outlet as a quick lime stream. A portion of the packed bed, defined by a reaction wave section of the calcinator, is preheated to above approximately 1400° F. The process gas stream is directed through the packed bed portion and a reaction wave is formed therein. The reaction wave thermally oxidizes the VOCs in the process gas while the temperatures in the packed bed result in it being calcined. The sulfur-containing components react with the packed bed to form sulfur/calcium components. The sulfur/calcium components exit the calcinator with the quick lime stream and are recovered by the Kraft process.

In a preferred embodiment of the invention, the packed bed descends via gravity through the calcinator. Further, the rate of descent is controlled with a rotary air lock valve.

Accordingly, it is an object of the present invention to provide systems and methods for reducing sulfur emissions by recovering sulfur from the NCGs emitted by the Kraft process. Other and further objects and advantages will appear hereinafter.

BRIEF DESCRIPTION OF THE DRAWINGS

Prior Art

DESCRIPTION OF THE PREFERRED EMBODIMENTS

The present invention reduces the sulfur and odor emissions from a paper-making Kraft process by recovering the sulfur in the non-combustible gases (NGCs) emitted by the Kraft process. This is performed using two general embodiments of the invention. In the first general embodiment, the NGCs are oxidized in a flameless thermal oxidizer to form a sulfur-containing, gaseous products stream. The gaseous products stream is scrubbed with a scrubbing solution to remove the sulfur components, forming $S_2O_3$ and $SO_4$, and $SO_3$ soluble salts in the scrubber liquid. The liquid stream from the scrubber is directed back into the Kraft process, thus recovering the sulfur.

In the second general embodiment of the invention, the NGCs are flamelessly oxidized in a moving, packed bed calcinator. The calcinator receives a lime mud stream, forms a packed bed therefrom, calcines the packed bed, and releases it as a quick lime stream. Concurrently, the NCGs are directed through the moving, packed bed and are flamelessly oxidized in a reaction wave in the packed bed to form a gaseous products stream with sulfur components. The sulfur components react with the packed bed to form sulfur/calcium components. The sulfur/calcium components exit the calcinator with the quick lime stream and are recovered by the Kraft process. Detailed descriptions of the two general embodiments follow.

Recovering Sulfur with a Flameless Thermal Oxidizer and Scrubber System

Figure 2:
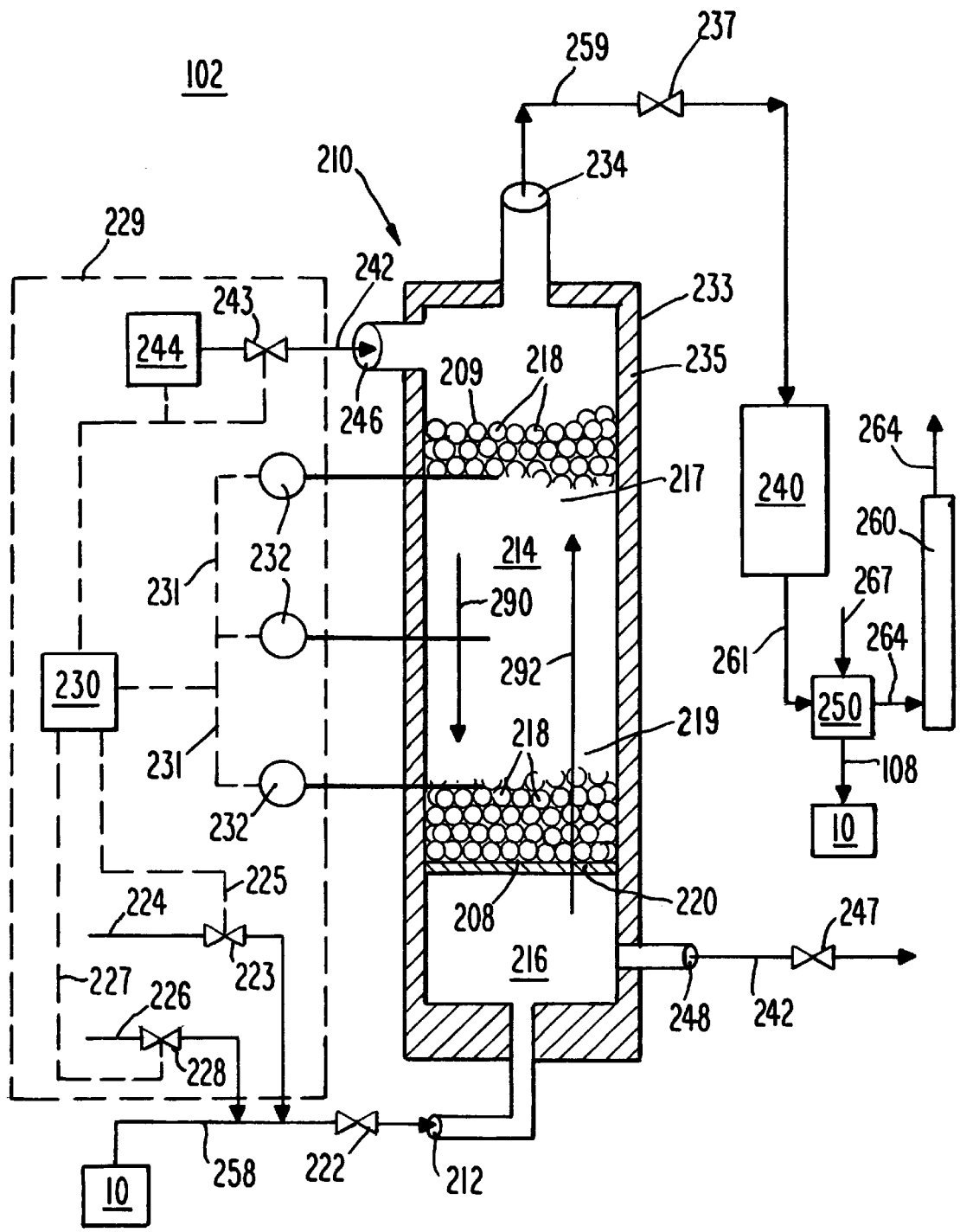
FIG. 2 is a schematic of a flameless thermal oxidizer and scrubber system utilizing the improved preheating system of the present invention in a "top-down" preheating fluid path arrangement.

Now referring to FIG. 2, a flameless thermal oxidizer and scrubber system 102 used to recover sulfur comprises a flameless thermal oxidizer 210, a quench 240, a scrubber 250, and a stack 260. In general, flameless thermal oxidizers operate by oxidizing gases within a porous bed of matrix heat-resistant material. Significant research into the phenomena of oxidation within matrix beds of heat-resistant materials that are contained within flameless thermal oxidizers has recently been undertaken. Because such oxidation can occur outside the normal premixed fuel/air flammability limits, the technology can be called "flameless." In this regard U.S. Pat. Nos. 4,688,495 (Galloway) and 4,823,711 (Kroneberger et al.) disclose early work on matrix thermal oxidation technology. In addition, U.S. Pat. Nos. 5,165,884 (Martin et al.); 5,320,518 (Stilger I); 5,533,890 (Holst I); 5,601,790 (Stilger II); 5,635,139 (Holst II); and 5,637,283 (Stilger III) discuss in significant detail the technology involved in the designing of flameless thermal oxidizers. The issued Galloway, Kroneberger et al., Martin et al., Stilger I, Holst I, Stilger II, Holst II, and Stilger III patents are incorporated in their entireties by reference herein. It is understood that the names used to designate the U.S. Patents represent the types of flameless thermal oxidizers disclosed in the U.S. Patents. For example, Martin discloses a straight-through type flameless thermal oxidizer, and Stilger discloses, in for example FIG. 11, a recuperative type flameless thermal oxidizer.

Figure 3:
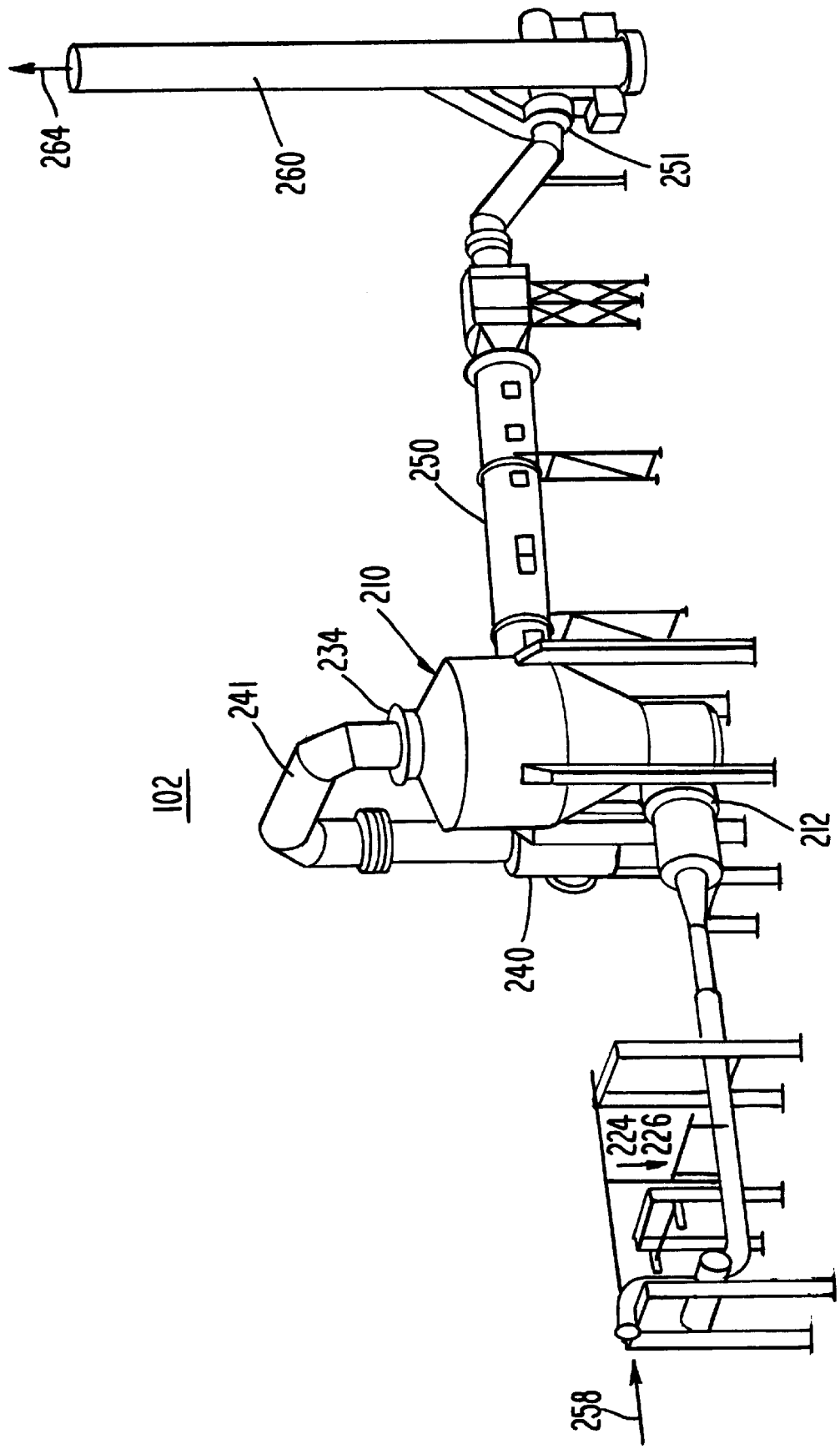
FIG. 3 is a perspective view of an embodiment of the flameless thermal oxidizer and scrubber system.

FIGS. 2 and 3 show an embodiment of a flameless thermal oxidizer and scrubber system 102 used in practicing the invention. In FIG. 2, the system 102 is shown schematically with the flameless thermal oxidizer 210 shown in an enlarged view in comparison to the other processing units. FIG. 3 shows a perspective view of an arrangement of the system 102. The flameless thermal oxidizer 210 is fully disclosed in pending patent application "Thermal Oxidizers with Improved Preheating Means and Processes for Operating Same," Ser. No. 08/659,579, filed on Jun. 6, 1996, (Attorney Docket No. THER-0248) which is incorporated herein by reference in its entirety. The flameless thermal oxidizer 210 has an oxidizer inlet 212 through which a process gas stream 258 flows into the flameless thermal oxidizer 210. In the preferred embodiment of the invention, the process gas stream 258 is comprised of NCGs or partially combusted NCGs from the Kraft process 10. Other gases may also be present in the stream 258.

The process gas stream 258 is introduced into a plenum 216, if used, within the flameless thermal oxidizer 210. The stream 258 passes through the plenum 216 and then through the matrix bed 214 of heat-resistant materials 218 in an oxidizer flow path 292. In the preferred embodiment, the oxidizer flow path 292 is oriented in a generally upward direction. Other embodiments of the invention may have the oxidizer flow path 292 oriented in a generally downward direction. The matrix bed 214 has a leading surface 208, which is proximate to the oxidizer inlet 212, and a back surface 209, which is opposite the leading surface 208. A perforated plenum plate 220 may be used to separate the plenum 216 from the matrix bed 214.

Upon entering the flameless thermal oxidizer 210, the process gas stream 258 is raised to oxidation temperatures of 1400–3500° F. (760–1925° C.), and preferably 1550–1800° F. (845–980° C.), by the stored heat in the matrix bed 214. The process gas stream 258 is maintained at the oxidation temperatures within an established reaction wave within the matrix bed 214 for a sufficient residence time to ensure substantially complete oxidation of the VOCs to stable products, such as $CO_2$, $H_2O$, and $SO_2/SO_3$—resulting in a gaseous products stream 259. The destruction efficiency of the flameless thermal oxidizer 210 is at least 99%, preferably at least 99.9%, and more preferably at least 99.99%, by weight of the VOCs. The reaction wave is observed as a steep increase in the temperature of the matrix bed 214 from the temperature of the process gas stream 258 on the inlet side of the wave to approximately the adiabatic oxidation temperature of the gases on the outlet side of the wave. This rapid change takes place over a relatively short distance in a typical oxidizer, with the actual distance being dependent upon feed concentrations, feed rates, gas velocity distribution, bed material, and bed physical properties, type of specific feed materials, etc. Heat losses along and perpendicular to the direction of flow also will have an effect on the length of the oxidation wave.

The matrix bed 214 may be sized for any desired process gas stream by altering the matrix bed 214 flow cross-section, height, material, void fraction, outlet temperature, and supplemental heat addition, if desired. The matrix materials 218 are described as being solid, heat-resistant materials in that they can withstand the elevated temperatures of the oxidation process. Preferred matrix materials 218 are ceramic balls and saddles, but other bed materials and configurations may be used, including, but not limited to, other random ceramic packings such as Ty-Pak or pall rings, structured ceramic packing, ceramic or metal foam, metal or ceramic wool and the like.

Generally, ceramic balls are useful as the matrix materials 218 if they have a diameter from about 0.0625 to 3 inches (0.159–7.62 cm), preferably about ¾ inch (1.9 cm). Another useful configuration is the use of ceramic saddles typically from 0.0625 to 3 inch (0.159–7.62 cm) nominal size, preferably about 0.5 to 1.5 inches (1.27–3.81 cm) nominal size. Other useful packing materials are pall rings and rashig rings with diameters from about 0.0625 to 3 inches (0.159–7.62 cm), and preferably from about 0.5 to 1.5 inches (1.27–3.81 cm).

A ceramic foam material may also be utilized as a matrix material. A typical foam material that can be utilized has a void fraction of 10 to 99%, preferably 75 to 95%, and most preferably about 90%. The pore sizes in any preferred ceramic foam material will be about 0.1 to 1,000 pores per inch (0.04 to 400 pores per cm), preferably about 1 to 100 pores per inch (0.4 to 40 pores per cm), and most preferably about 10 to 30 pores per inch (4 to 12 pores per cm).

Other shapes of ceramic materials may be utilized for matrix material, such as honeycomb-shaped ceramics.

Instead of a ceramic, the heat-resistant matter used to form the bed may also be a metal, which may be randomly packed or may have a structured packing.

Generally, the void fraction of the matrix bed will be between 0.3 and 0.9. In addition, the material in the matrix bed will typically have a specific surface area ranging from 40 $m^2/m^3$ to 1040 $m^2/m^3$.

The combustion of the VOCs in sucha flameless thermal oxidizer is more complete than flame combustion because the laminar and plug flow characteristics of the thermal oxidation process and the good distribution of heat resulting from the intra-matrix surface radiation coupled with surface convection. According to the present invention, the VOCs are also heated by the oxidation reaction, further increasing the completeness of the reaction.

The plenum 216 will act to evenly distribute the gases entering the oxidizer 210 and further mix these gases prior to entering the matrix bed 214. It is believed that this helps to achieve a relatively flat cross-sectional profile of the oxidation wave perpendicular to the direction of the flow of the gases through the matrix bed 214. In some instances the plenum 216 may be desirable to achieve the flatness of the cross-section of the wave, depending on the configuration of the matrix bed 214. As shown in FIG. 2, the plenum 216 is separated from the matrix bed 214 by the plenum plate 220, which is gas permeable.

The plenum 216 is shown in FIG. 2 as being a void space. However, the plenum 216 can also be filled with matrix material 218 as described in U.S. Ser. No. 08/347,870 now U.S. Pat. No. 5,560,128, grant date of Jul. 22, 1997, entitled "Method and Apparatus for Destruction of Volatile Organic Compound Flows of Varying Concentration," which is incorporated by reference herein in its entirety. For instance, the plenum 216 can contain a different type of matrix material 218 (e.g., ceramic balls) than that used in the matrix bed 214 (e.g., ceramic saddles). In such a construction, the plenum 216 would typically have an interstitial volume in the range of about 40% and the matrix bed 214 would have an interstitial volume in the range of about 70%.

The position and stability of the oxidation wave within the flameless thermal oxidizer 210 can be controlled with a process controller 230 of a heating system 229. Prior to entering the flameless thermal oxidizer 210, the process gas stream 258 can be supplemented with a supplemental air stream 224 or a supplemental fuel stream 226. The supplemental fuel stream 226 may contain methane, propane, butane, or any other suitable fuel. The rates of addition of the supplemental air stream 224 and/or the supplemental fuel stream 226 may be regulated with the process controller 230. The process controller 230 is electronically wired to a control valve 223 in the air stream 224 and to a control valve 228 in the fuel line 226, via lines 225 and 227, respectively. The supplemental air and/or fuel streams are used to maintain the reaction wave within the flameless thermal oxidizer 210. The position of the reaction wave is monitored by the process controller 230 via thermocouples 232 in the matrix bed 214. In the preferred embodiment, thermocouples 232 are "K" type control thermocouples that generate one or more signals indicative of the temperature of the matrix bed. The thermocouples transmit the signals via lines 231 to the controller 230, which adjusts the supplemental air and/or fuel streams flow in response to the signals. The process controller 230 can also control the flow rate of the process gas stream 258 via valve 222, which can be electronically wired (not shown) to the controller 230.

The embodiment of the invention shown in FIG. 2 uses "top-down" preheating to preheat the matrix bed 214. A reaction portion of the matrix bed 214 must be preheated to the oxidization temperature prior to directing the process gas stream 258 into the oxidizer. This is accomplished in a preheating step. The incorporated-by-reference patents describe preheating the matrix bed to the oxidation temperature. The embodiment of the invention shown in FIG. 2 preheats the matrix bed portion by sealing off the oxidizer inlet 212 and the oxidizer outlet 234 while flowing a preheating fluid stream 242 from a preheater 244 through the matrix bed 214. The oxidizer inlet 212 is sealed off by closing the valve 222 in the stream 258. The oxidizer outlet 234 is sealed off by closing the valve 237 in the gaseous products stream 236 exiting the outlet. The preheating fluid stream 242 is directed into the oxidizer by opening the valve 243 in the stream to permit the fluid to flow through the preheating fluid inlet 246. The preheating fluid stream 242 exits the flameless thermal oxidizer 210 through a preheating fluid outlet 248. The preheating fluid stream 242 flows in a preheating fluid path 290 through the matrix bed 214 that extends between the preheating fluid stream inlet and outlet. In the embodiment of the invention shown in FIG. 2, the preheating fluid flow path 290 is oriented in a generally downward direction, thus providing "top-down" preheating. As is shown in FIG. 2, the process controller 230, the thermocouples 232, and the supplemental streams 224 and 226 are part of the heating system 229. Other embodiments of the invention may have other heating systems of equivalent and suitable arrangements for preheating the matrix bed 214 and maintaining the temperatures and the reaction wave therein.

The preheating step continues for a period of time sufficient to preheat a portion of the matrix bed 214 such that upon introduction of the process gas stream 258, the VOCs in the stream are oxidized. Thus, the entirety of the matrix bed 214 does not have to be, and is preferably not, preheated to the temperature at which oxidation of the VOCs will take place. In preferred embodiments, the matrix bed will be preheated such that the portion of the matrix bed 214 that is opposite, or distant, from the point of the introduction of the process gas stream 258 will be at a temperature above the oxidation temperature of the VOCs, while the portion of the matrix bed 214 that is proximate to the point of the introduction of the process gas stream 258 will be at a temperature below the oxidation temperature of the VOCs.

A benefit of "top-down" preheating is that it helps to prevent thermal shock and destruction of the matrix bed 214. The process stream 258 flowing through the flameless thermal oxidizer 210 may be water vapor saturated. When the unit is shut down, water vapor may condense on the surface of the lower portion 219 of the matrix bed 214. With "bottom-up" preheating, the water saturated matrix bed 214 is thermally shocked upon initiation of the flow of the preheating fluid stream 242, causing the matrix bed 214 to breakdown. Thermal shock does not occur with any frequency in a unit operated with "top-down" preheating where the process gas stream 258 flows in an oxidizer flow path 292 that is countercurrent to the preheating fluid flow path 290. Thermal shock is inhibited when the oxidizer flow path 292 is down and the preheating fluid flow path 290 is up.

Figure 4:
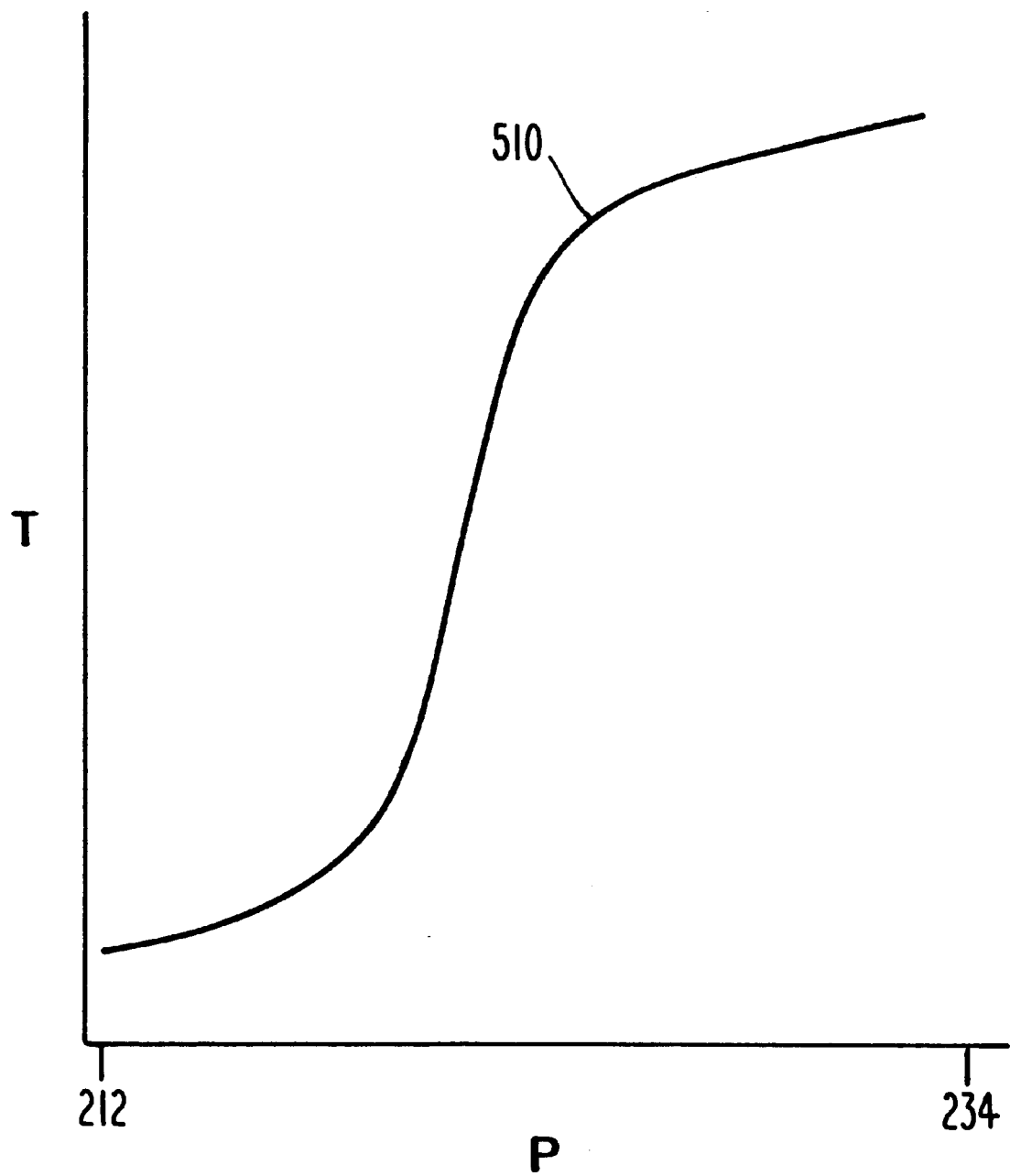
FIG. 4 is a graph of the temperature of the matrix bed along the distance through the matrix bed from the non-condensible gases inlet to the flameless thermal oxidizer outlet following the preheating steps of the present invention.

The difference in temperature between an upper portion 217 and the lower portion 219 of the matrix bed 214 after the preheating step has been conducted is primarily due to the convective heat absorption characteristics of the matrix materials 218. These materials readily absorb the heat from the heating fluid 242 and thus the matrix bed 214 is heated in an advancing wave fashion rather than as a collective mass of material. A general preheating profile is represented in FIG. 4 where the temperature of the matrix bed 214 is plotted versus the position from the non-condensible gas inlet 212 to the flameless thermal oxidizer outlet 234 for the oxidizer shown in FIG. 2. As can be seen, the upper portion 217 of the matrix bed 214 can be preheated preferentially with respect to the lower portion 219. After establishing such a preheated bed profile, the process gas stream 258 can be safely introduced into the matrix bed 214 without any hazard of unwanted oxidation of the stream prior to entering the matrix bed 214 due to an overly heated plenum 216.

The preheating generally is continued for a time sufficient to preheat at least about 25% of the matrix bed 14, preferably from about 25% to about 75% of the matrix bed, more preferably from about 25% to about 65% of the matrix bed, and even more preferably from about 30% to about 60% of the matrix bed. These percentages are on a linear distance of the bed basis, measured from the back surface 209 of the matrix bed 214.

The preheating sequence can be controlled by the process controller 230. The thermocouples 232 can be used to monitor the temperature profile of the matrix bed 214. When the upper portion 217 of the matrix bed 214 reaches a sufficiently high temperature, the controller 230 can be used to shut off the preheater 244. The flameless thermal oxidizer 210 is switched from preheat mode to operation mode by closing valves 243 and 247, and opening valves 222 and 237. The process gas stream 258 may then be introduced into the oxidizer 210. These steps may be regulated by the controller 230.

Figure 5:
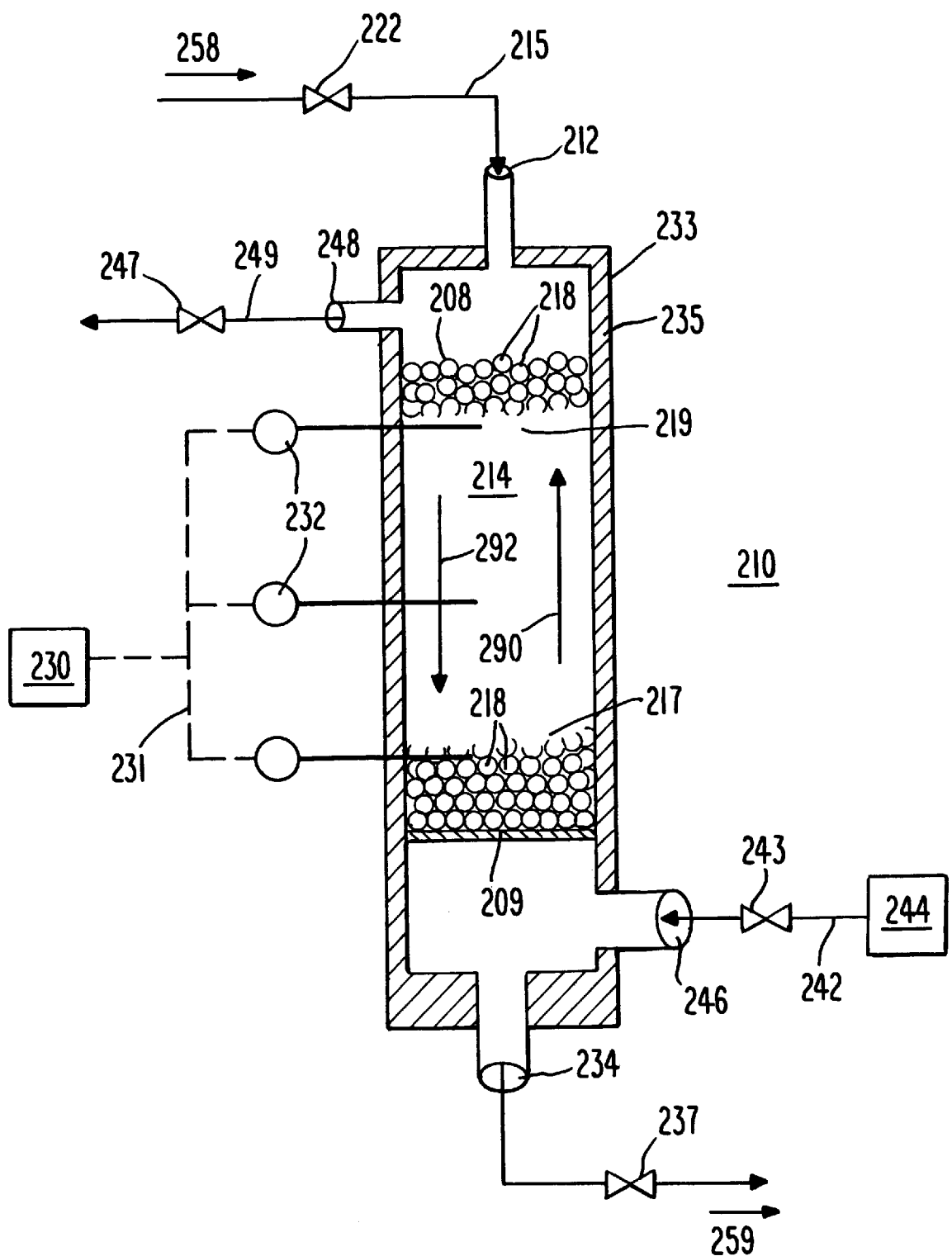
FIG. 5 is a schematic of a flameless thermal oxidizer with a "bottom-up" preheating fluid path arrangement.

The description of the invention has been in general terms and, with respect to FIG. 2, a "bottom-up" process gas stream flow design has been described in detail. The present invention is also applicable to a top-down process gas stream flow design, such as the one shown in FIG. 5. In FIG. 5, the process gas stream 258 enters the flameless thermal oxidizer 210 from the top through inlet 212 and exits via the bottom through outlet 234, resulting in a generally downward oxidizer flow path 292. The preheating fluid traverses through the matrix bed 214 in countercurrent flow path 290, that is, from the bottom of the oxidizer to the top. Further, this arrangement will also inhibit thermal shock, as previously described. The other material aspects of the oxidizer 210 and its associated process equipment are similar to that described for the embodiment shown in FIG. 2.

The present invention has been described with respect to the use of "straight-through" flameless thermal oxidizers (FIGS. 2 and 5). The benefits of the present invention can also be obtained by using other flameless thermal oxidizers, e.g., recuperative heating flameless thermal oxidizers of the kind disclosed in Stilger I.

The flameless thermal oxidizer 210 has an outer containment shell 233 that is preferably made of carbon steel. This outer containment shell 233 is preferably lined with high temperature insulation 235. In the preferred embodiment of the invention, the high temperature insulation 235 is ceramic brick.

After thorough destruction of the VOCs contained in the process gas stream 258 by the flameless thermal oxidizer 210, the resulting gaseous products stream 259 exits the oxidizer 210 through the flameless thermal oxidizer outlet 234. The gaseous products stream 259 will generally be at elevated temperatures, and various means can be used to lower its temperature. In a preferred embodiment of the invention, the stream 259 is cooled in the quench 240 to below 180° F. in order to protect the downstream equipment and piping. Water sprays (not shown) in the quench 240 come into direct contact the stream 259 and vaporize. This adiabatic quenching results in a cool gas stream 261. In an embodiment of the invention, the gaseous products stream 259 is directed from the flameless thermal oxidizer 210 to the quench 240 through a conduit preferably constructed of a corrosion resistant material such as Hastelloy C-276. It is noted that the use of valve 237 can be replaced if a quench 240 is employed in the system by flooding the quench 240 to establish a hydrostatic water pressure greater than the preheating fluid pressure within the oxidizer. It should be noted that any appropriate cooling means may be used to cool the hot gas stream 259.

The cool gas stream 261 exits the quench 240 and is directed into the scrubber 250. A scrubber solution stream 267 is also directed into the scrubber 250. The scrubber solution stream 267 can be any basic liquid preferably having a pH greater than 9.0. The scrubber solution stream may be for example an aqueous solution comprising ammonium hydroxide or a metal salt of a hydroxide or carbonate. Suitable metal salts of a hydroxide or carbonate include for example an alkali metal or alkaline earth metal hydroxide or carbonate such as NaOH, $Na_2CO_3$, KOH, $K_2CO_3$, $Ca(OH)_2$, or combinations thereof. In a preferred embodiment of the present invention, the scrubber solution stream comprises white liquor from the Kraft process, an aqueous solution of NaOH or combinations thereof. As the scrubber solution stream 267 mixes with cool gas stream 261, the $SO_2/SO_3$ components of the gas stream are absorbed and react with the solution to form a scrubbed gas stream 264 and a spent scrubber solution stream 108 containing $S_2O_3$ and $SO_4$, and $SO_3$ soluble salts. In a preferred embodiment of the invention, the scrubber 250 may introduce the scrubber solution stream 267 into the interior of scrubber 250 via atomizing nozzles (not shown). Additionally, a fan 251 may be employed to minimize the net pressure drop of the gases flowing through the scrubber 250 (see FIG. 3). In a preferred embodiment, a TURBOTAK wet scrubber is used, which is available through Turbotak Technologies, 550 Parkdale Drive, Suite A14, Waterloo, Ontario, N2L 5V4. However, other appropriate scrubbing means, e.g. packed tower and venturi scrubbing, may be used.

At least a portion of the spent scrubber solution stream 108 is directed from the scrubber 250 into the black liquor processing section 13 of the Kraft process 10, as described below, thus recovering the sulfur from the NCGs back into the Kraft process 10. The scrubbed gas stream 264 is directed to a stack 260 and subsequently released to the atmosphere. In a preferred embodiment of the invention, the scrubbed gas stream 264 has extremely low levels of sulfur components and the odor of the scrubbed gas stream is extremely reduced or eliminated.

Figure 17:
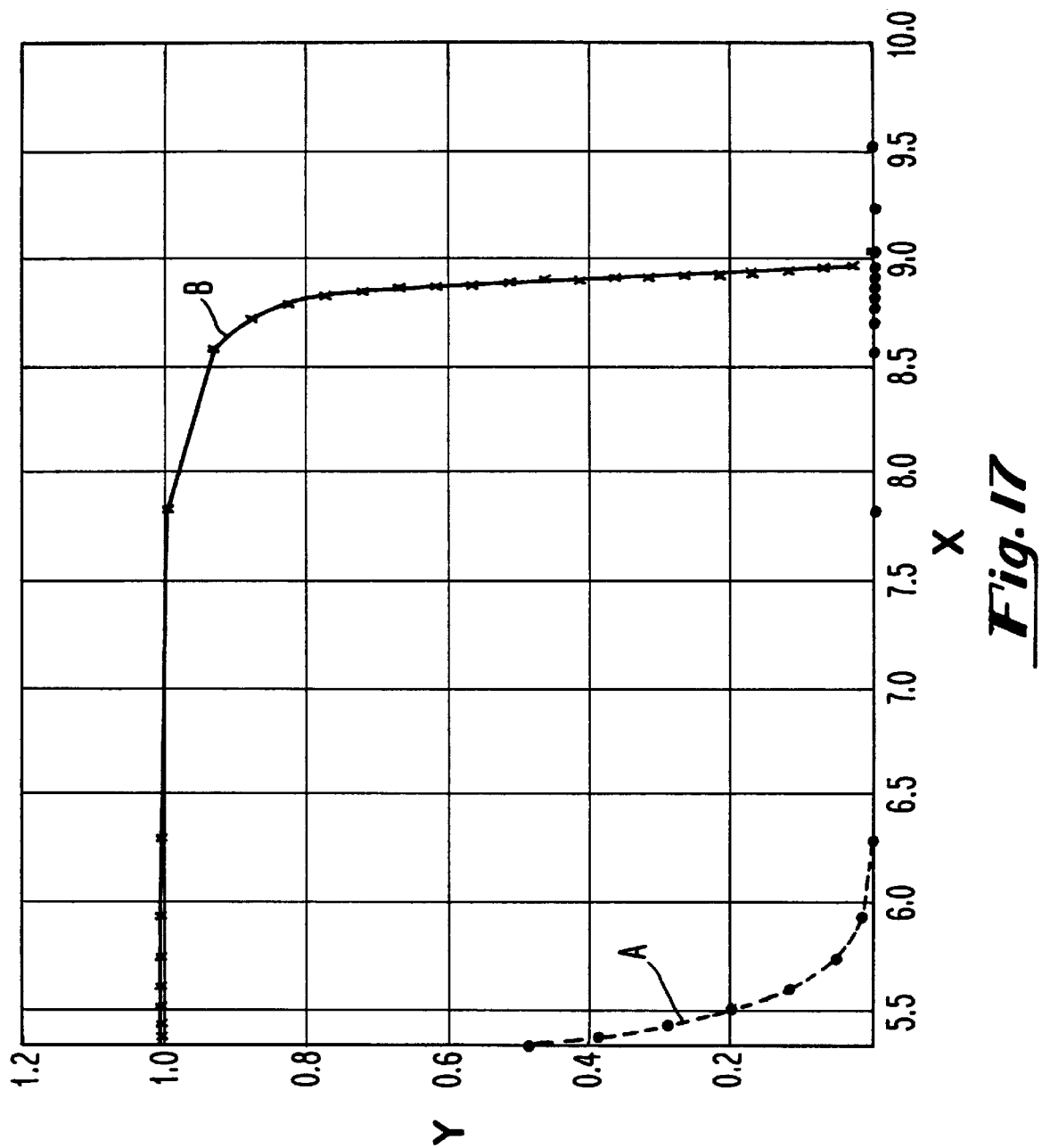
FIG. 17 is a graph showing the effect of the pH of the spent scrubber solution stream on the absorption of $SO_2$ (line A) and $CO_2$ (line B). The Y-axis shows the amount of $SO_2$ and $CO_2$ present in the scrubbed gas stream (pounds per hour, multiplied by $10^{-3}$); and the X-axis shows the pH of the spent scrubber solution stream.

In a preferred embodiment of the present invention, at least a portion of the spent scrubber solution stream 108 is recycled back to a scrubber solution stream inlet 270. However, because of $SO_2/SO_3$ and $CO_2$ being present in the cool gas stream 261, the pH of the spent scrubber solution stream 108 is preferably maintained at a pH equal to or greater than 5.0, preferably from about 5.5 to about 9.0, more preferably from about 6.0 to 8.5, and most preferably from about 6.5 to about 8.0. For example, FIG. 17 shows the effect of the pH of the spent scrubber solution stream 108 on the absorption of $SO_2$ (line A) and $CO_2$ (line B). The Y-axis of FIG. 17 shows the amount of $SO_2$ and $CO_2$ present in the scrubbed gas stream 264 in pounds per hour, multiplied by $10^{-3}$; and the X-axis shows the pH of the spent scrubber solution solution stream 108. As discussed previously, it is desirable to absorb the $SO_2$ in the scrubber solution stream.

As shown in FIG. 17, the amount of $SO_2$ absorbed begins to decrease when the pH of the spent scrubber solution stream 108 is about 6 or less. However, it is undesirable to absorb the $CO_2$ in the scrubber solution stream because when the $CO_2$ is absorbed, $H_2CO_3$ is formed. The $H_2CO_3$ shifts the equilibrium balance in the scrubbing solution, resulting in dissolved sulfides in the scrubber solution stream being undesirably liberated as gaseous $H_2S$, thereby reducing the "cleanliness" of the scrubbed gas stream 264, worsening the odorous emissions, and reducing the recovery of sulfur in the cool gas stream 261. The absorption of $CO_2$ begins to increase when the pH of the spent scrubber solution stream 108 is about 8 or greater as shown in FIG. 17. Additionally, the pH of the scrubber solution is affected by the absorption of the components in the cool gas stream 261. For example, the absorption of $SO_2$ causes the pH of the scrubber solution to decrease to less than a pH of 6.0 absent a means for controlling the pH. Therefore, a means for controlling the pH of the spent scrubber solution stream 108 is preferably used.

Figure 6:
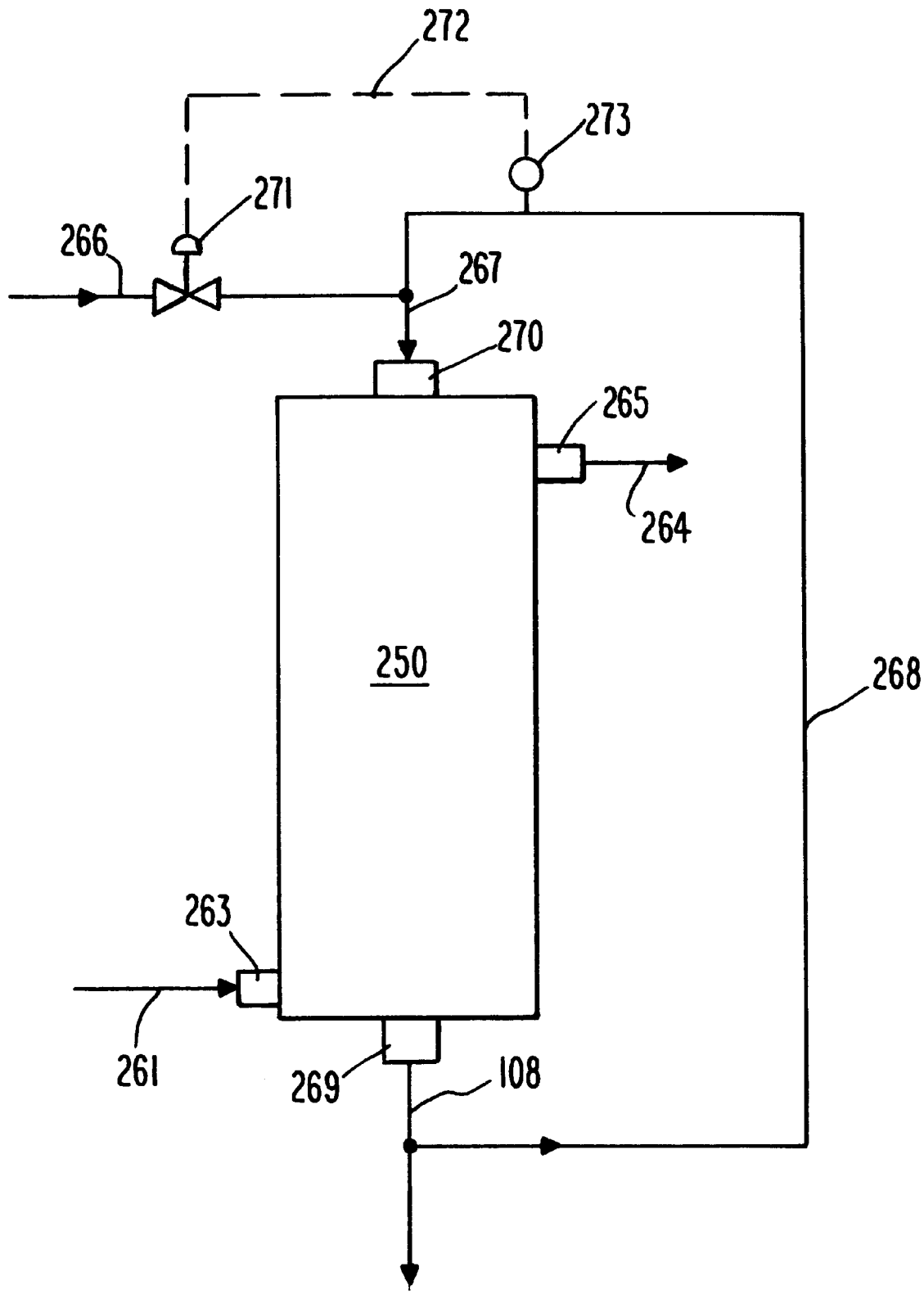
FIG. 6 is a schematic of the scrubber with a recycle stream and a pH control means.

FIG. 6 shows a preferred embodiment of the invention where at least a portion of spent scrubber solution stream 108 of scrubber 250 is recycled, and the pH of the scrubber solution is controlled. In FIG. 6, the scrubber solution stream 267 consists of a fresh scrubber solution stream 266 and a recycle portion 268. The recycle portion 268 is obtained from spent scrubber solution stream 108 leaving through scrubber solution stream outlet 269. The cool gas stream 261 is fed into the scrubber 250 through cool gas stream inlet 263 and exits out a gas stream outlet 265 after being scrubbed.

The pH of the scrubber solution as shown in FIG. 6 is controlled by monitoring the pH of recycle portion 268 of spent scrubber solution stream 108 via a pH indicator 273 that transmits a signal 272. In response to the signal 272, the flow rate of fresh scrubber solution 266 is adjusted using control valve 271. Preferably, the pH of the spent scrubber solution stream 108 is maintained at an aqueous pH equal to or greater than 5.0, preferably from about 5.5 to about 9.0, more preferably from about 6.0 to 8.5, and most preferably from about 6.5 to about 8.0. As one skilled in the art will recognize other suitable control schemes are possible. For example, pH indicators may be in other suitable locations, such as in the spent scrubber solution stream 108, the bottom of the scrubber, or the scrubber solution stream 267.

The fresh scrubber solution 266 is a basic solution (i.e., pH greater than 7), and is preferably a strong basic solution having a pH greater than 9, and more preferably a pH greater than 12. Suitable fresh scrubber solutions include solutions containing ammonium hydroxide or a metal salt (e.g., alkali metal or alkaline earth metal) of a hydroxide or carbonate. Suitable metal salts of a hydroxide or carbonate include for example $NaOH$, $Na_2CO_3$, $KOH$, $K_2CO_3$, $Ca(OH)_2$, or combinations thereof. In a preferred embodiment of the present invention, the fresh scrubber solution stream 266 comprises white liquor from the Kraft process, an aqueous solution of NaOH, or combinations thereof.

Figure 7:
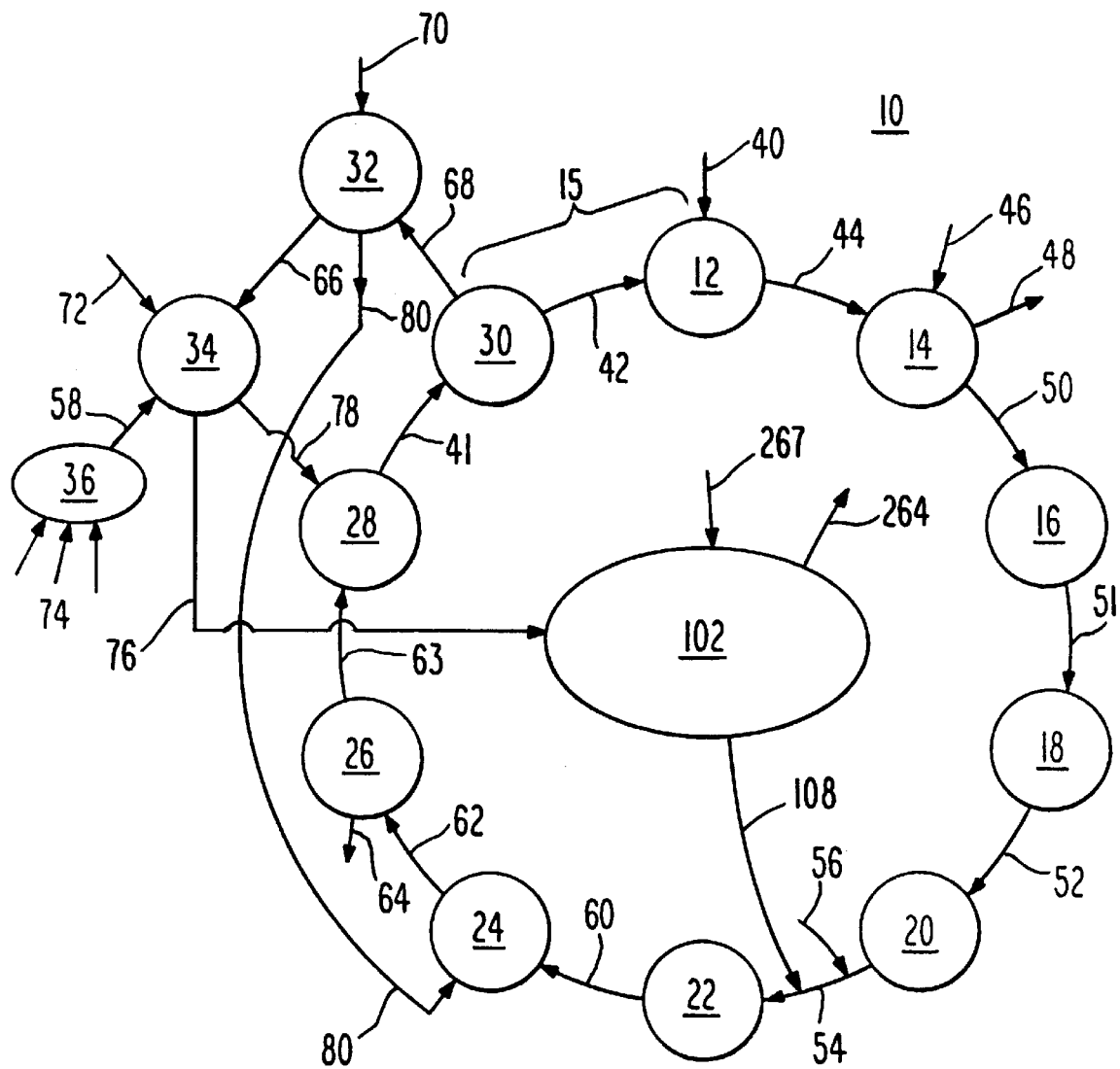
FIG. 7 is a schematic representing an embodiment of the invention wherein the NCGs are partially destroyed in a lime kiln and are then oxidized in a flameless thermal oxidizer system with the sulfur being recovered by the Kraft process.

Referring now to FIG. 7, the flameless thermal oxidizer and scrubber system 102 is shown integrated into the Kraft process 10 according to an embodiment of the invention. Lime kiln 34 has been modified so that the kiln emissions stream 76 is not released into the air, but is delivered to the system 102. The system 102 processes the kiln emissions stream 76 as previously described in connection with processing the processing gas stream 258. The scrubbed gas stream 264 is released into the air while an spent scrubber solution stream 108 containing $S_2O_3$ and $SO_4$, and $SO_3$ soluble salts is reintroduced into Kraft process 10 at the black liquor 54 stream. In other embodiments of the invention, the spent scrubber solution stream 108 may be fed to other points of the Kraft process 10. One advantage of this embodiment of the invention is that if lime kiln 34 fails to operate, the flameless thermal oxidizer and scrubber system 102 operates as an NCG treatment back-up.

Figure 8:
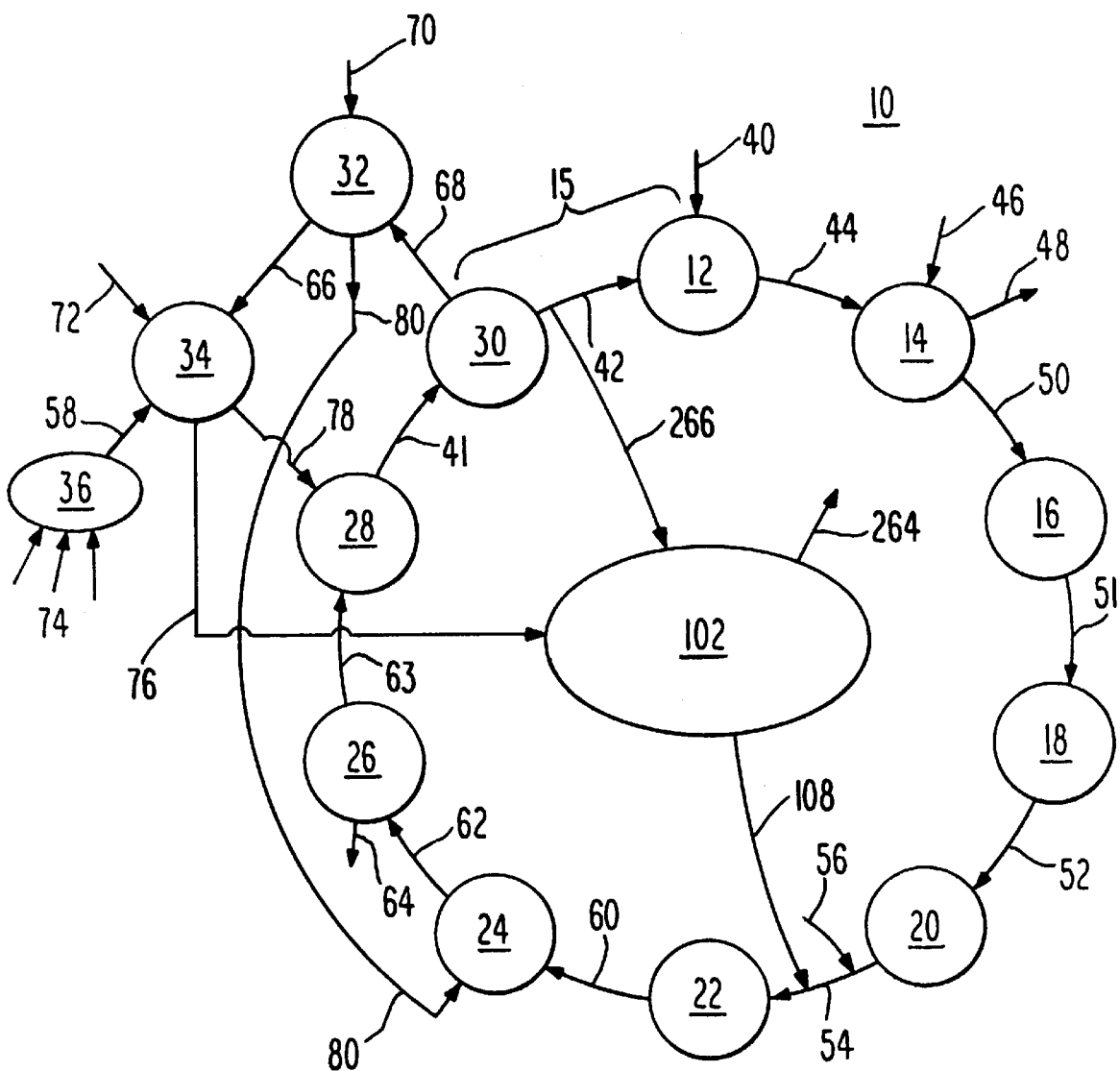
FIG. 8 is a schematic representing the invention wherein the scrubber solution is white liquor removed from the Kraft process.

In an embodiment of the invention, as shown in FIG. 8, the fresh scrubber solution stream 266 may be a portion of the white liquor stream 42. Other embodiments of the invention may direct the white liquor stream from other locations in the white liquor processing section 15 of the Kraft process 10.

Figure 9:
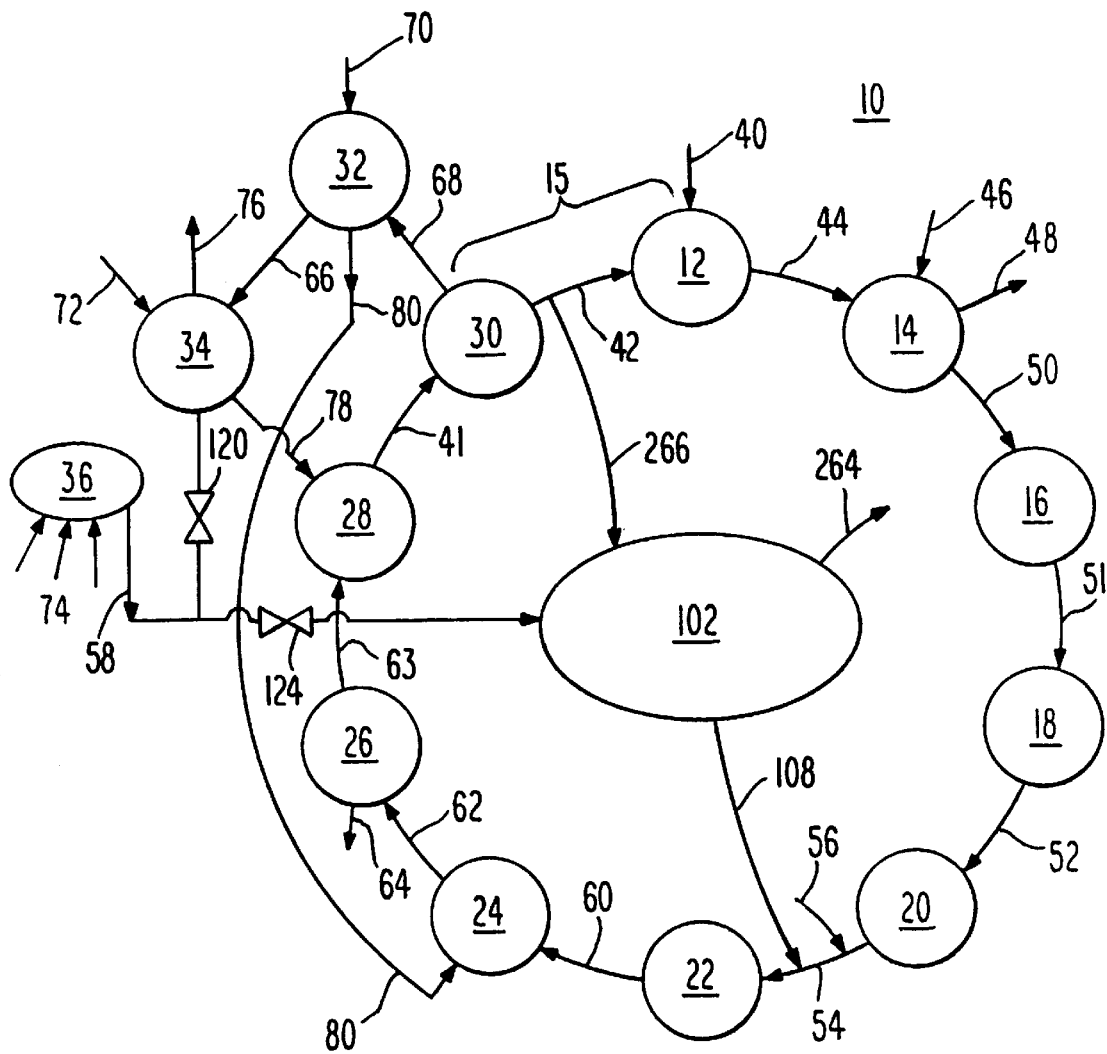
FIG. 9 is a schematic representing the invention wherein the scrubber solution is white liquor and the non-condensible gases may be sent to the lime kiln, the flameless thermal oxidizer system, or both.

The embodiment of the present invention as shown in FIG. 9 has the NCGs collection system 36 delivering the NCG stream 58 either to the lime kiln 34 and/or to the flameless thermal oxidizer and scrubber system 102 for treatment. This is done by opening or closing the appropriate valves 120 and 124 in the stream 58. The kiln emissions stream 76 and the scrubbed gas stream 264 are released to the atmosphere or a subsequent processing system. This configuration adds desirable flexibility for treating the emissions.

Figure 10:
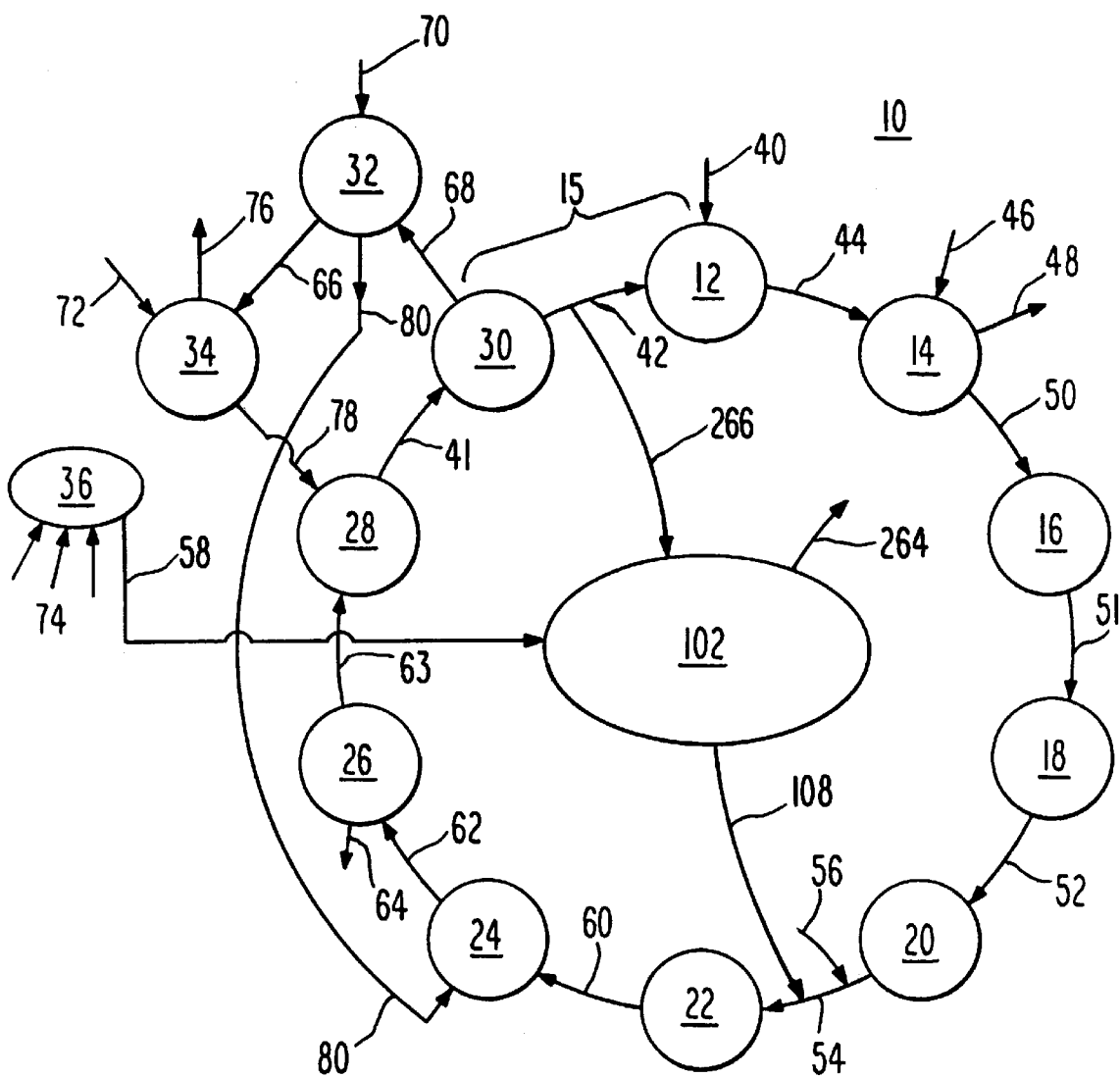
FIG. 10 is a schematic representing the invention wherein the non-condensible gases are delivered to the flameless thermal oxidizer.

The embodiment of the present invention as shown in FIG. 10 has the NCGs collection system 36 delivering the NCG stream 58 directly to the flameless thermal oxidizer and scrubber system 102 for treatment, bypassing the lime kiln 34.

Figure 11:
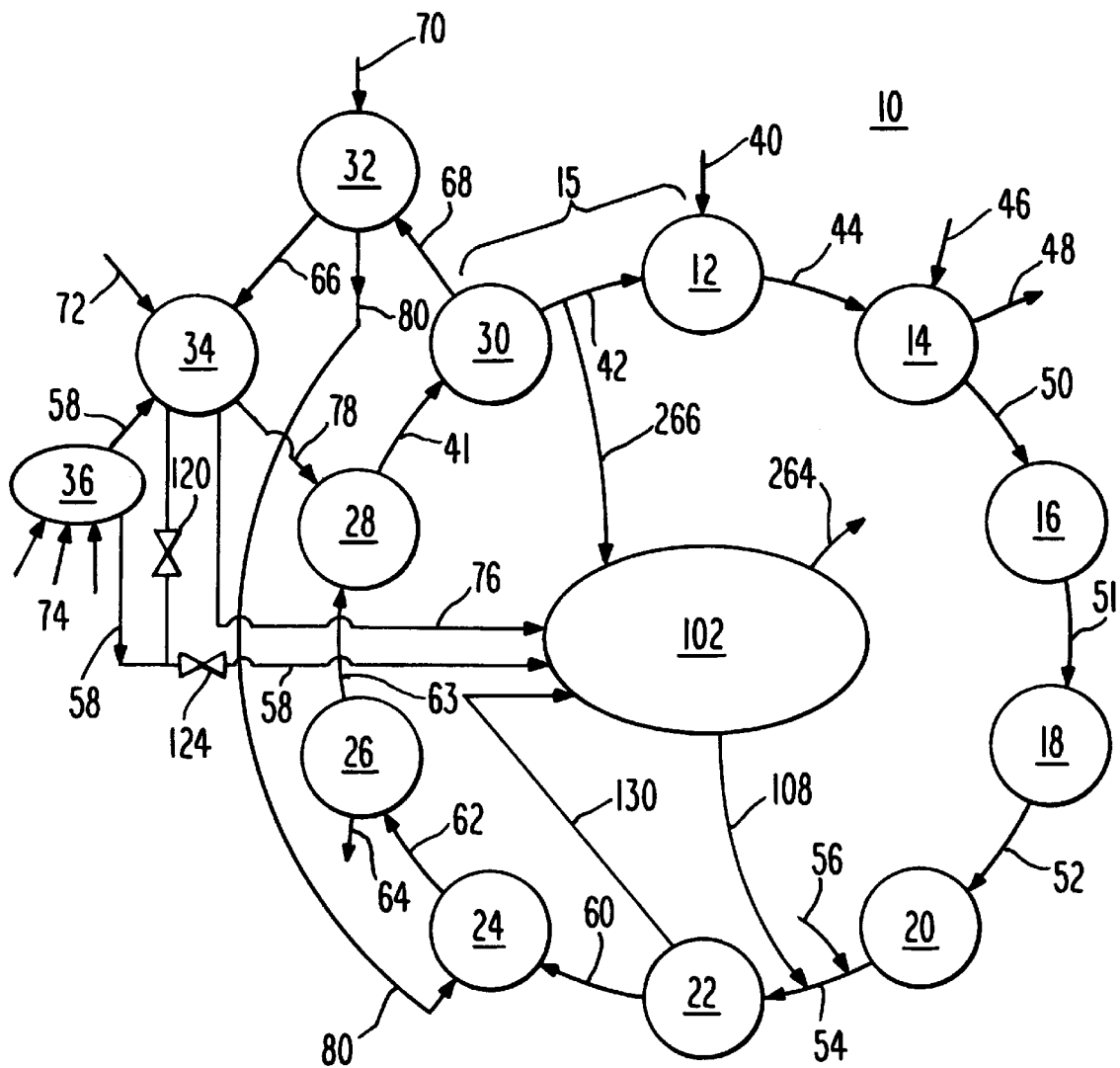
FIG. 11 is a schematic representing the invention wherein the non-condensible gases are delivered to the flameless thermal oxidizer and/or the lime kiln with the lime kiln emissions also being delivered to the flameless thermal oxidizer. The schematic also represents the invention wherein the flue gas from the recovery furnace is delivered to the flameless thermal oxidizer.

The embodiment of the present invention as shown in FIG. 11 is similar to the embodiment shown in FIG. 9, with two exceptions. First, the kiln emissions stream 76 from the lime kiln 34 is directed to the flameless thermal oxidizer and scrubber system 102 to be treated as a process gas stream. Second, a flue gas stream 130 from the recovery furnace 22 is delivered to the flameless thermal oxidizer and scrubber system 102. The flue gas stream 130 is traditionally treated by flowing it through an economizer, precipitator, and scrubber (not shown). The benefit of delivering the flue gas 130 to the flameless thermal oxidizer and scrubber system 102 is to recover sulfur used in the Kraft process, reduce odor emissions, and reduce sulfur emissions from the burning of fuel in the recovery furnace 22. The sulfur emissions from the recovery furnace can be relatively high when high sulfur fuel is burned. Other embodiments of the invention may also treat the flue gas 130 as an NCG of the Kraft process.

Recovering Sulfur with a Moving, Packed Bed Lime Calcinator

Figure 1:
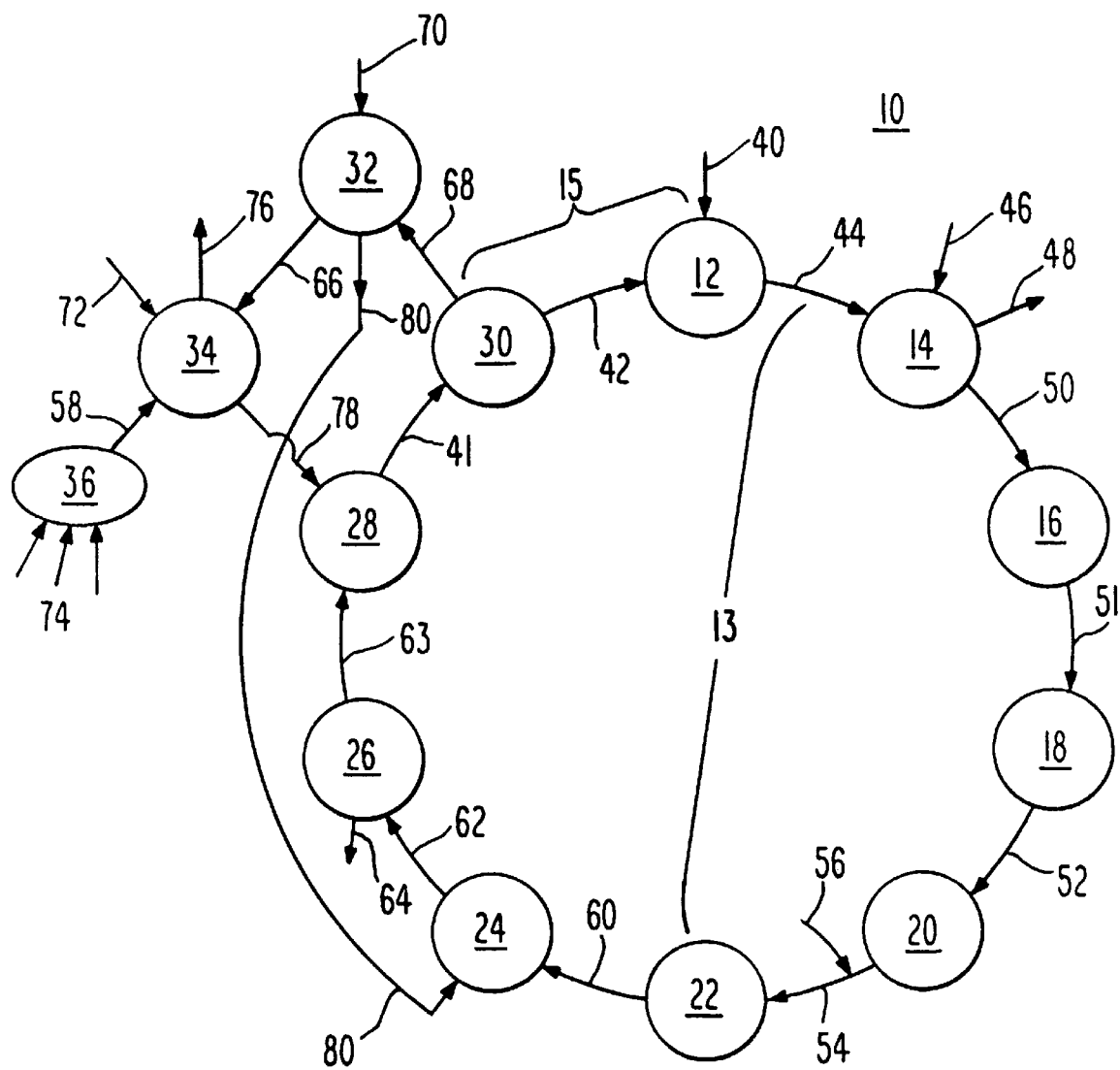
FIG. 1 is a schematic representing the Kraft paper pulping process.
Figure 12:
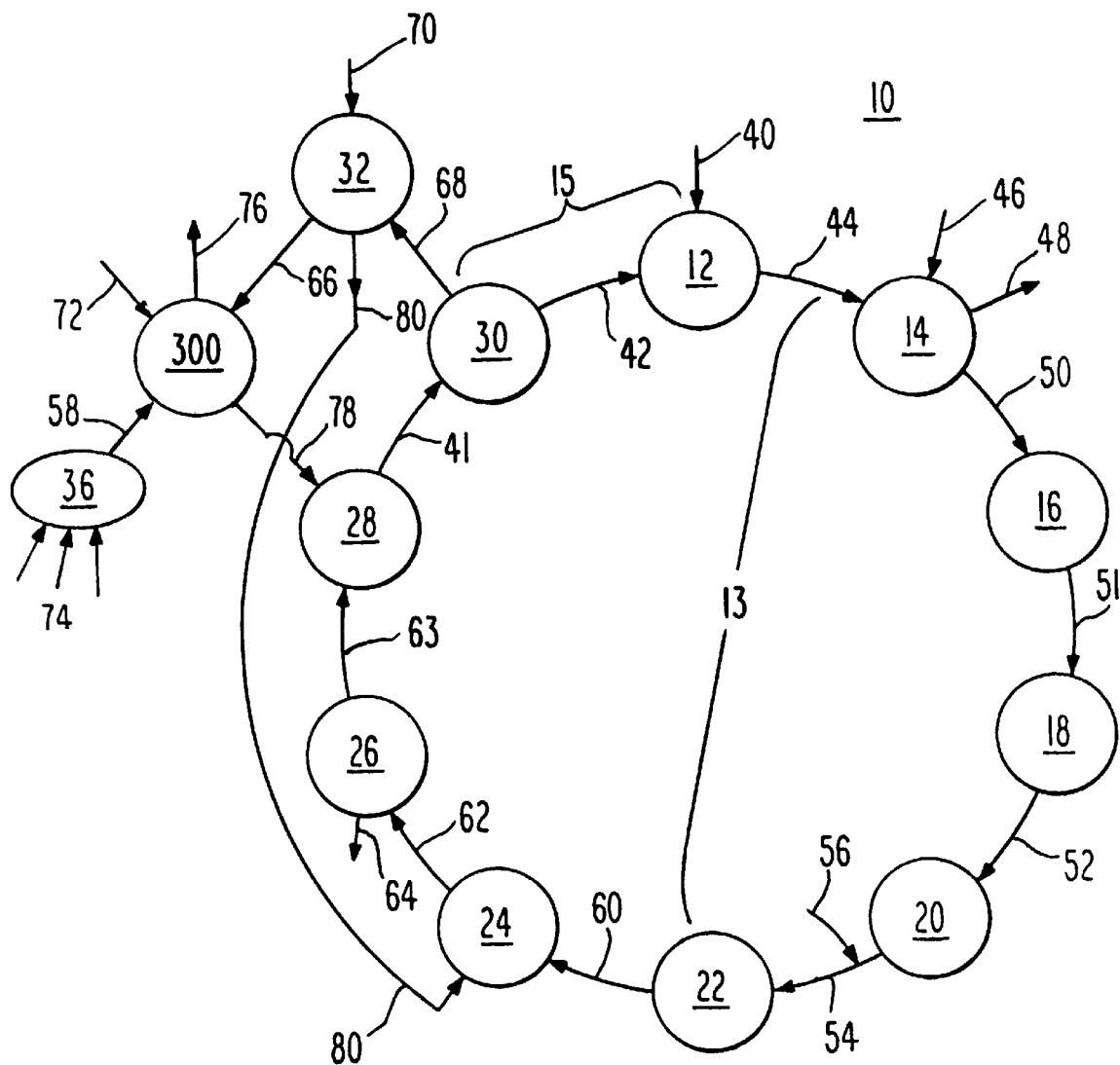
FIG. 12 is a schematic representing the invention wherein the lime kiln is replaced with a moving, packed bed calcinator.

Now referring to FIG. 12, a moving, packed bed calcinator 300 may be used to calcine the washed lime mud stream 66 and recover sulfur from the NCGs released by the Kraft process. This is accomplished by incorporating the sulfur into the quick lime stream 78 that is directed to the slaker and caustisizer 28 of the Kraft process. The calcinator 300 replaces the lime kiln 34 of the Kraft process disclosed in Prior Art FIG. 1.

Figure 13:
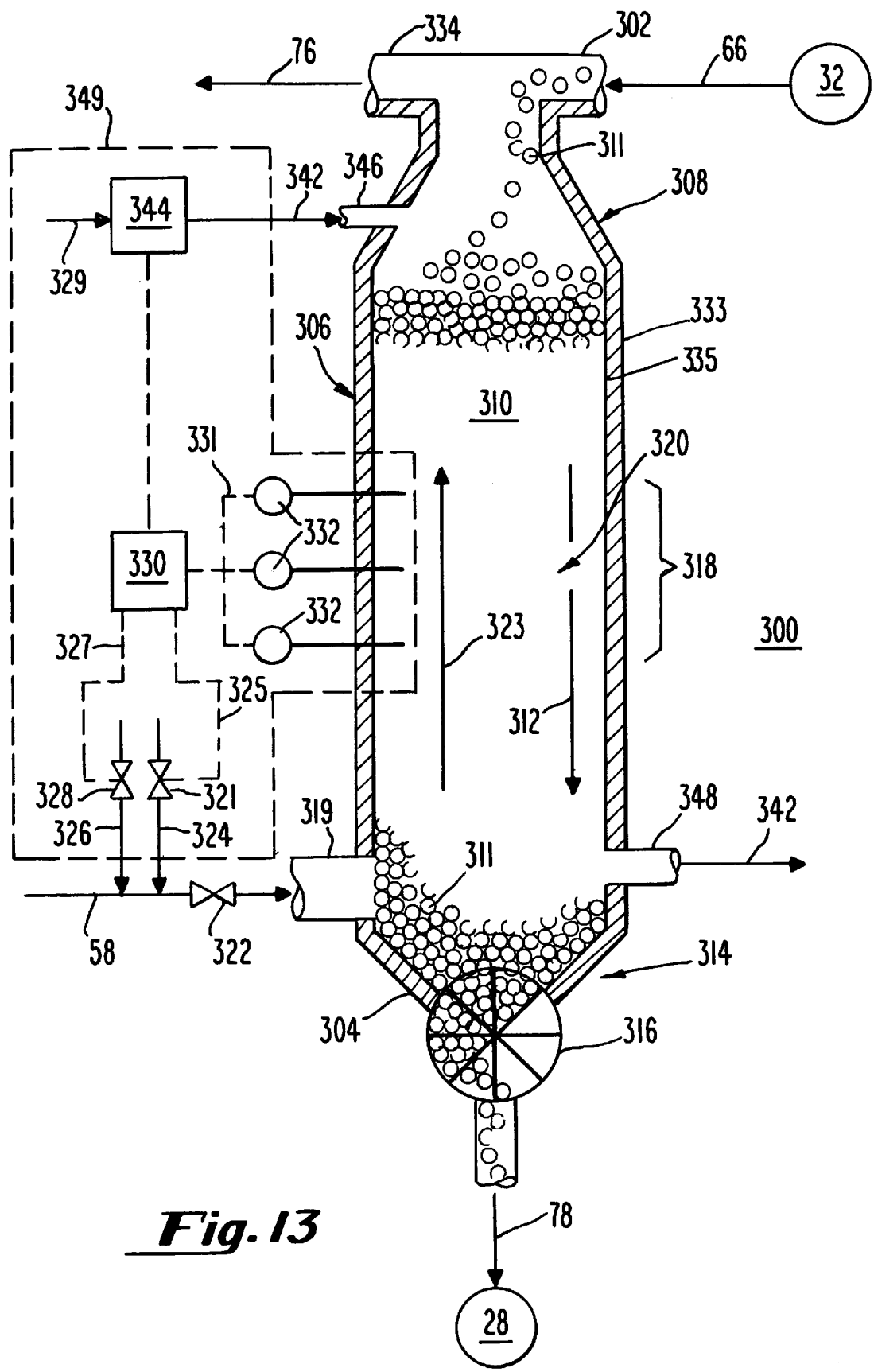
FIG. 13 is a schematic of the moving, packed bed calcinator.

Now referring to FIG. 13, the moving, packed bed calcinator 300 has a lime mud inlet 302, a quick lime outlet 304, and a guide means 306 therebetween. The guide means 306 comprises an outer containment shell 333 that is preferably made of carbon steel. The outer containment shell 333 is preferably lined with high temperature insulation 335. In a preferred embodiment of the invention, high temperature insulation 335 may be ceramic brick. The outer containment shell 333 is preferably generally cylindrical in shape, but other embodiments of the invention may be generally prismatic.

During operation, the lime mud stream 66 enters the calcinator through the lime mud inlet 302 at the calcinator's top end 308. The guide means 306 enables a packed bed 310 to be formed from the lime mud stream 66. The guide means 306 also directs the packed bed 310 in a packed bed flow direction 312 to a bottom end 314 of the calcinator. The packed bed 310 is made up of particles 311 from the lime mud stream 66. While moving through the calcinator 300, the packed bed 310 is calcined by heating it as explained below. The packed bed 310, after calcination, exits the calcinator through a rotary air lock valve 316 at the bottom end 314 as the quick lime stream 78 and is directed to the slaker and causticizer 28. The lime mud stream 66 replenishes the packed bed 310 as the quick lime stream 78 exits the calcinator 300.

In addition to the calcination reaction occurring in the calcinator 300, the process gas stream 58 comprised of NCGs from the Kraft process is flamelessly oxidized in the packed bed 310. To accomplish this, a portion 320 of the packed bed 310 is preheated to above at least 1400° F., and more preferably to approximately 1800° F. These temperatures are sufficient to calcine the packed bed 310. The packed bed portion 320 is defined by a reaction wave section 318 of the calcinator 300. The reaction wave section 318 is approximately half way between the top end 308 and the bottom end 314 in the embodiment shown in FIG. 11. Other embodiments may have other locations for the reaction wave section 318.

A heating system 349, comprised of a preheater 344, preheats the packed bed portion 320. More specifically, the packed bed portion 320 is preheated by directing a preheating fluid 342 from the preheater 344 to a preheater inlet 346, which is located vertically above the packed bed in the shown embodiment. The preheating fluid 342 thus enters the calcinator 300, is directed downward through the packed bed 310, and exits through the preheater fluid outlet 348 located at the bottom end 314 of the calcinator. This is a "top-down" preheating method, as previously described. The calcinator 300 may also be arranged to use a "bottom-up" preheating method by having the preheating fluid 342 enter the calcinator through outlet 348 and exit through inlet 346.

The preheater 344 can be any device that will create a heated fluid that can be used to raise the temperature of the packed bed 310. Typically, the preheater 344 will be a gas burner, fired by natural gas, which can produce a preheating gas having a temperature above 1400° F., and more commonly between about 1600° F. and 2200° F.

Subsequent to initiating preheating, the process gas stream 58 is directed through the packed bed portion 320 to establish a reaction wave therein. This is similar to establishing the reaction wave in the matrix bed 214 of previously described flameless thermal oxidizer 210 (e.g., FIG. 2). The stream 58 enters the calcinator through one or more gas inlets 319 (one shown) located at the calcinator's bottom end 314. The stream 58 is directed in a gas stream flow 323 through the packed bed portion 320. The reaction wave in the packed bed portion 320 oxidizes at least a portion of the VOCs in the process gas stream 58 to form gaseous products with $SO_2$ and $SO_3$ components. The preheating step is discontinued prior to directing the process gas stream 58 through the packed bed 310.

The gaseous products formed in the reaction wave continue to flow toward the top end 308 and out the gaseous products stream outlet 334 as the emissions stream 76. The $SO_2$ and $SO_3$ components of the gaseous products react with the packed bed 310 to form sulfur/calcium components. The sulfur/calcium components exit the calcinator 300 with the quick lime stream 78 to be recovered by the Kraft process in the slaker and causticizer 28.

While the packed bed 310 is moving through the calcinator 300, the heating system 349 maintains the position and stability of the reaction wave in the calcinator's reaction wave section 318. More specifically, a process controller 330 in the heating system 349 monitors the position of the reaction wave via thermocouples 332 in the packed bed 310. The thermocouples transmit signals representative of the packed bed temperature via lines 331 to the controller 330. In response to the signals, the controller 330 adjusts the flow of a supplemental air stream 324 or a supplemental fuel stream 326 by directing valves 321 and 328 in the streams via transmission lines 325 and 327 respectively. The streams 324 and 326 supplement the process gas stream 58 entering the calcinator 300. The supplemental fuel stream 326 may contain methane, propane, butane, or any other suitable fuel. The process controller 330 may also direct the valves 322 and 316 to control the reaction wave position by adjusting the process gas stream 58 flowrate and the quick lime stream 78 flowrate, respectively (not shown). The process controller 330 may also direct the preheating of the packed bed 310 via line 329 to the preheater 344. Other embodiments of the invention may have other heating systems of equivalent and suitable arrangements for preheating the packed bed portion 320 and maintaining the temperatures and the reaction wave in the packed bed 310.

In a preferred embodiment of the invention, the packed bed flow 312 may be directed downward and the process gas stream flow 323 is countercurrent to it. In a more preferred embodiment, the packed bed 310 flows via gravity.

Figure 14:
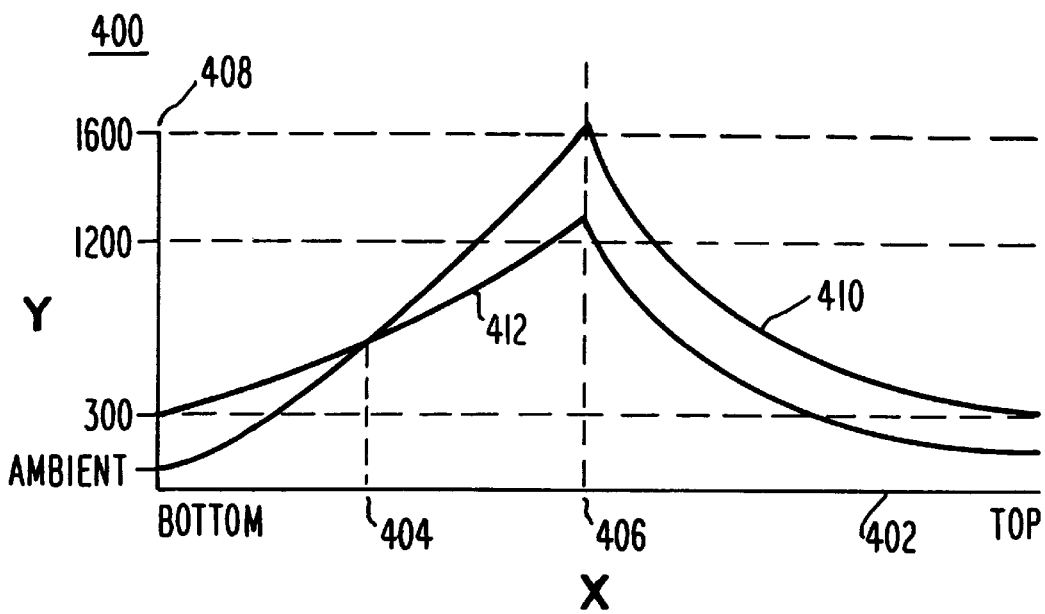
FIG. 14 is a graph of the temperature of the packed bed and the gases flowing through the moving, packed bed calcinator.

Now referring to FIG. 14, a graph 400 is a temperature profile of the packed bed 310 during steady state operation of the calcinator 300 shown in FIG. 13. The x-axis 402 indicates the distance in the packed bed 310 from the bottom. Points 404 and 406 on the x-axis approximately indicate the beginning and the end of the reaction wave in the packed bed. The y-axis 408 indicates the temperature, in ° F., of the packed bed at different locations. Line 410 is the temperature profile of the gases moving through the packed bed 310. Line 412 is the temperature profile of the packed bed. The gases enter the bottom of the packed bed 310 at about ambient temperature and rise to a peak temperature of greater than about 1600° F. at point 406. The packed bed 310 is at about ambient temperature when it enters at the top and its temperature rises to about 1200° F. at point 406. After passing through the reaction wave, both the gas and the packed bed drop in temperature and exit the calcinator at about 300° F.

Other embodiments of the invention may have the process gas stream flow 323 be co-current with the packed bed flow 312 by reversing the gas inlet 322 and the emission outlet 346. Further embodiments of the invention may have the packed bed flow upward under mechanical means, such as a pulse system as disclosed in U.S. Pat. No. 4,385,993 (Hendricks), which is incorporated herein by reference in its entirety. Other embodiments may use a pinch valve, or other suitable valve, to control the quick lime stream 78 flow.

Figure 15:
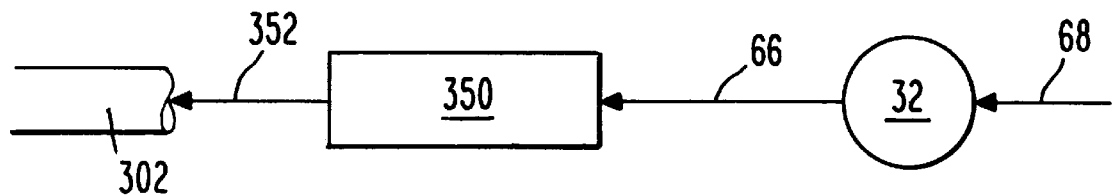
FIG. 15 is a schematic of an embodiment of the invention that uses a drying means to reduce the water content of the lime mud stream prior to entering the moving, packed bed calcinator.

Now referring to FIG. 15, an embodiment of the invention partially dries the lime mud stream 66 prior to entering the lime mud inlet 302 of the calcinator 300. The lime mud stream 66 is directed through a lime mud drying means 350. The lime mud means 350 partially dries the lime mud stream 66 to produce a partially-dried lime mud stream 352 having less than approximately 20% water, and preferably less than 10% water. The partially-dried lime mud stream 352 is directed through the lime mud inlet 302 of the calcinator 300. In the preferred embodiment of the invention, the lime mud drying means 350 may be a heated screw conveyor that partially dries the lime mud stream 66 into the partially-dried lime mud stream 352 and forms stream into particles. However, the particles need to be within predetermined limitations to have appropriate void space in the packed bed 310. In an embodiment of the invention, one of the predetermined limitations is that the particles have diameters between approximately 0.125 and 3.0 inches. In a more preferred embodiment of the invention, an additional predetermined limitation is that all the particle diameters are in a range of less than approximately 1.0 inches. In a further preferred embodiment, there is a predetermined limitation that all the particle diameters are in a range of less than approximately 0.5 inches.

Figure 16:
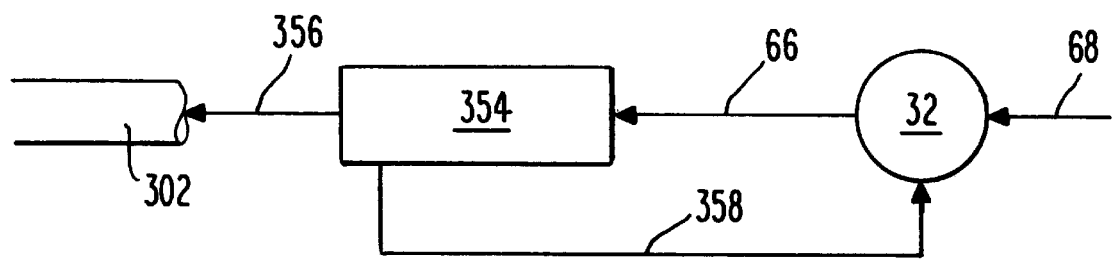
FIG. 16 is a schematic of an embodiment of the invention that is a drying means to reduce the water content of the lime mud stream prior to entering the moving, packed bed calcinator and culls out the particles of the lime mud stream that do not fall into a predetermined limitation.

Referring now to FIG. 16, the lime mud stream 66 is directed to a lime mud drying means with culling ability 354 (e.g., such as a conveyor dryer in flow communication with a delumper) to be partially dried into a partially-dried lime mud stream 356 and a culled portion stream 358. The partially-dried lime mud stream 356 is made up of particles fitting into predetermined limitations. Possible predetermined limitations have been discussed previously. The partially-dried lime mud stream 356 is directed through the lime mud inlet 302 of the calcinator 300. The culled portion stream 358 is made up of particles formed by the means 354 that fall outside of the predetermined limitations. The culled portion stream 358 is directed back to the mud washer and filter in the preferred embodiment of the invention.

In a preferred embodiment of the invention, the lime mud drying means 350 and the lime mud drying means with culling ability 354 may both be designed to keep the lime mud stream 66 below 800° F. so as to inhibit calcination prior to the calcinator 300 and more preferably below 300° F. to avoid vapor explosions that can disintegrate the particles.

The flameless thermal oxidizer and scrubber system may be used to treat other gases in addition to the NCGs of the Kraft process. Further, the moving, packed bed calcinator may be used to calcine lime mud or lime stone without being integral with a Kraft process. Consequently, the present invention may be embodied in other specific forms without departing from the spirit or essential attributes thereof and, accordingly, reference should be made to the appended claims, rather than to the foregoing specification, as indicating the scope of the invention.

What is claimed is:

1. A method of removing sulfur from a process gas stream comprising the steps of:
   a. directing a lime mud stream into a calcinator;
   b. forming the lime mud stream into a packed bed in the calcinator;
   c. converting the lime mud in the calcinator into quick lime by heating the packed bed;
   d. preheating at least a portion of the packed bed to above 1400° F.;
   e. subsequent to initiating the preheating step, directing the process gas stream through at least the portion of the packed bed, thereby establishing a reaction wave therein that oxidizes at least a portion of volatile organic compounds in the process gas stream to form a gaseous products stream with $SO_2$ and $SO_3$ components that react with the packed bed to form sulfur/calcium components therein;
   f. directing the gaseous products stream out of the packed bed;
   g. establishing a packed bed flow through the calcinator by directing the packed bed with the sulfur/calcium components out of the calcinator as a quick lime stream and replenishing the packed bed from the lime mud stream; and
   h. maintaining the position of the reaction wave in the reaction wave portion of the calcinator by controlling flowrates of supplemental fuel and air streams into the process gas stream.

2. The method of claim 1 further comprising the step of directing the packed bed flow and the process gas stream generally countercurrent to each other.

3. The method of claim 1 further comprising the step of directing the packed bed flow and the process gas stream generally cocurrent to each other.

4. The method of claim 1 wherein the establishing the packed bed flow step further comprises the step of directing the packed bed flow in a generally downward direction.

5. The method of claim 1 wherein the step of maintaining the reaction wave in the reaction wave portion further comprises the steps of:
   a. directing the quick lime stream out of the calcinator through a rotary air lock valve located at a bottom end of the calcinator; and
   b. controlling the flowrate of the packed bed flow by adjusting the rotary air lock valve.

6. The method of claim 1 wherein the preheating step comprises the step of directing a heating fluid stream through the packed bed in a heating flow path that is generally countercurrent to the packed bed flow.

7. The method of claim 1 wherein the preheating step comprises the step of directing a heating fluid stream through the packed bed in a heating flow path that is generally cocurrent to the packed bed flow.

8. The method of claim 1 further comprising the step of partially drying the lime mud stream prior to the directing the lime mud stream into the calcinator step.

9. The method of claim 8 wherein the step of partially drying the lime mud stream comprises drying the lime mud stream to less than about 20% water.

10. The method of claim 8 wherein the step of partially drying the lime mud stream further comprises the steps of:
    a. forming partially-dried lime mud particles from the lime mud stream; and
    b. culling particles out of the lime mud stream having diameters outside of a predetermined limitation.

11. The method of claim 10 wherein the predetermined limitation is about 0.125 inches to about 3.0 inches.

12. The method of claim 10 further comprising the steps of:
    a. directing the quick lime stream to a slaker and causticizer system of a Kraft process, wherein the step of partially drying the lime mud stream further comprises the step of partially drying a lime mud stream being directed from a mud washer and filter system of the Kraft process; and
    b. delivering the culled particles to the mud washer and filter system.

13. The method of claim 8 further comprising the step of directing the quick lime stream to a slaker and causticizer system of a Kraft process, wherein the step of partially drying the lime mud stream further comprises the step of partially drying a lime mud stream being directed from a mud washer and filter system of the Kraft process.

14. The method of claim 8 wherein the step of partially drying the mud stream further comprises the step of directing the mud stream through a heated screw conveyor.

15. The method of claim 8 wherein the step of partially drying the mud stream further comprises the step of keeping the lime mud stream below about 800° F.

* * * * *